(12) United States Patent
Kojima et al.

(10) Patent No.: US 8,154,152 B2
(45) Date of Patent: Apr. 10, 2012

(54) METHOD OF CONTROLLING DC/DC CONVERTER, FUEL CELL VEHICLE FOR CARRYING OUT SUCH METHOD

(75) Inventors: Yasushi Kojima, Utsunomiya (JP); Naoyuki Mimatsu, Utsunomiya (JP); Seigo Murashige, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 333 days.

(21) Appl. No.: 12/468,519

(22) Filed: May 19, 2009

(65) Prior Publication Data
US 2009/0284080 A1 Nov. 19, 2009

(30) Foreign Application Priority Data
May 19, 2008 (JP) .................. 2008-130534

(51) Int. Cl.
*H02J 1/12* (2006.01)
*G05F 5/00* (2006.01)
(52) U.S. Cl. ........... 307/45; 323/282; 323/283; 323/299
(58) Field of Classification Search ............ 307/45, 307/64; 323/271, 282, 283, 285, 299
See application file for complete search history.

(56) References Cited

U.S. PATENT DOCUMENTS
6,215,287 B1 * 4/2001 Matsushiro et al. .......... 323/222
7,715,217 B2 * 5/2010 Manabe et al. ................ 363/95

FOREIGN PATENT DOCUMENTS
| JP | 11-89270 | 3/1999 |
| JP | 2000-262072 | 9/2000 |
| JP | 2002-112534 | 4/2002 |
| WO | WO-02/093730 A1 | 11/2002 |
| WO | WO 2006/104268 A1 * | 5/2006 |

OTHER PUBLICATIONS

Japanese Office Action for Application No. 2008-130534, dated Dec. 8, 2009.

* cited by examiner

*Primary Examiner* — Michael Rutland Wallis
(74) *Attorney, Agent, or Firm* — Nelson Mullins Riley & Scarborough LLP; Anthony A. Laurentano

(57) ABSTRACT

A triangular-wave current flows through a reactor of a DC/DC converter for converting voltages between increased and reduced levels. Surges are reduced, which are developed in an output voltage serving as a control voltage when the triangular-wave current changes across a zero value at which the current direction is changed. When a primary current flowing through the reactor changes across 0 [A] (zero value) at which the direction is changed, within an adjustment range, a feedback coefficient by which to multiply the error between the control voltage and a target voltage is multiplied by k (k>1) so as to increase a feedback amount. Surges developed in the control voltage due to a dead time when the primary current changes across 0 [A] are reduced.

14 Claims, 17 Drawing Sheets

METHOD OF CONTROLLING DC/DC CONVERTER, FUEL CELL VEHICLE FOR CARRYING OUT SUCH METHOD

BACKGROUND OF THE INVENTION

1. Field of the Invention

The present invention relates to a method of controlling a DC/DC converter which is suitable for use in a hybrid power supply system for supplying a load with electric power from a first power device and a second power device, and a fuel cell vehicle for carrying out such a method. In the fuel cell vehicle, for example, an inverter-driven motor serving as the load is supplied with electric power from a battery and a fuel cell.

2. Description of the Related Art

Heretofore, there has been proposed a DC/DC converter apparatus which is disposed between a high-voltage battery and a low-voltage battery for bidirectionally converting voltages (a high voltage into a low voltage and a low voltage into a high voltage) and bidirectionally passing currents (see Japanese Laid-Open Patent Publication No. 2002-112534).

There has also been proposed an apparatus including a DC/DC converter disposed between a high-voltage power supply in the form of a rectified AC power supply and a battery, for energizing a motor through an inverter under a secondary-side voltage of the DC/DC converter, i.e., the voltage of the high-voltage power supply (see International Publication No. WO 2002/093730).

According to the apparatus disclosed in International Publication No. WO 2002/093730, when the motor operates in a propulsive mode, the high-voltage power supply supplies a current to the motor, and the battery supplies a current to the motor through the DC/DC converter. When the motor operates in a regenerative mode, the battery is charged by the high-voltage power supply and the motor through the DC/DC converter. Consequently, the DC/DC converter disclosed in International Publication No. WO 2002/093730 also operates to bidirectionally convert voltages and bidirectionally pass currents.

The DC/DC converter for bidirectionally passing currents, as disclosed in Japanese Laid-Open Patent Publication No. 2002-112534 and International Publication NO. WO 2002/093730, basically comprises upper and lower arm switching devices and a reactor, and operates according to a synchronous switching scheme wherein the upper and lower arm switching devices are alternately turned on respectively before and after a dead time within one switching period. The dead time is inserted between the on-times of the upper and lower arm switching devices to prevent them from being simultaneously turned on and hence to prevent the high-voltage power supply from being short-circuited.

In the DC/DC converter which is capable of bidirectionally passing currents for synchronously switching the upper and lower arm switching devices, the reactor stores energy when the switching devices are turned on and discharges the stored energy when the switching devices are turned off. Therefore, triangular-wave currents having upper and lower peaks flow through the reactor.

The inventor of the present application has found that when the triangular-wave currents change across a zero value at which their current-flow directions are changed, the output voltage (control voltage) of the DC/DC converter develops surges (peaks) though the target voltage is constant (see FIGS. 11 and 13 of the accompanying drawings). The phenomenon of the surges will subsequently be described by way of a comparative example in connection with an embodiment of the present invention in the description of the invention for an easier understanding of the invention.

When a surge voltage is produced, a power apparatus and a load which are connected to the DC/DC converter have their efficiency lowered. Since it is necessary to establish higher settings for the withstand voltages of the power apparatus and the load and also the withstand voltages of the switching devices of the DC/DC converter, the DC/DC converter, the power apparatus, and the load have their costs increased.

SUMMARY OF THE INVENTION

It is an object of the present invention to provide a method of controlling a DC/DC converter, which is capable of reducing surges of an output voltage (control voltage) which are developed when triangular-wave currents flowing through a reactor change across a zero value at which their directions are changed, and a fuel cell vehicle for carrying out such a method.

According to the present invention, there is provided a method of controlling a DC/DC converter disposed between a first power device and a second power device and including upper and lower arm switching devices and a reactor, comprising the steps of setting an output voltage of either one of the first power device and the second power device as a target voltage, detecting the output voltage set as the target voltage, and controlling the DC/DC converter by multiplying an error between the detected output voltage and the target voltage by a feedback coefficient to perform feedback control, alternately turning on the upper and lower arm switching devices respectively before and after a dead time so that the output voltage can be equal to the target voltage, detecting a reactor current flowing through the reactor, and increasing the feedback coefficient when the detected reactor current is detected as changing across a zero value at which the direction of the reactor current is changed.

When the reactor current changes across the zero value at which the reactor current has its direction changed, the feedback coefficient by which to multiply the error between the output voltage (control voltage) and the target voltage is increased so as to increase a feedback amount. Accordingly, surges developed in the output voltage (control voltage) are reduced when the reactor current changes across the zero value.

An adjustment range for the feedback coefficient may be provided near the zero value, and the feedback coefficient may be increased when the reactor current is detected as falling within the adjustment range. In this manner, a detection error may be absorbed to reduce surges more reliably.

The feedback coefficient may be increased when the reactor current falls within the adjustment range and approaches the zero value, so that the detection error can be absorbed for more efficiently reducing surges.

The reactor current may be of a triangular waveform having an upper peak and a lower peak, and the feedback coefficient may be increased when either one of the upper peak and the lower peak changes across the zero value, or falls within the adjustment range, or falls within the adjustment range and approaches the zero value. Thus, surges are reduced in a more appropriate manner.

The feedback coefficient may be increased depending on one of current values of the upper peak and the lower peak which is closer to the zero value when both of the upper peak and the lower peak fall within the adjustment range. Thus, surges are reduced in a more appropriate manner.

A hunting suppressing process for reducing the feedback coefficient may be performed when the output voltage is detected as undergoing hunting near the target voltage while the feedback coefficient is being increased. Hunting of the output voltage at the time the reactor current is near the zero value is thus reduced.

Alternatively, a hunting suppressing process for reducing the feedback coefficient may be performed when the reactor current is detected as undergoing hunting though the target voltage is fixed while the feedback coefficient is being increased.

The feedback coefficient may be gradually reduced for stably reducing hunting.

Whether the output voltage undergoes hunting or not may be detected, based on the error between the output voltage and the target voltage.

For example, if the value of a signal generated by smoothing the absolute value of the error is equal to or greater than a threshold voltage, then the output voltage may be detected as undergoing hunting. In this manner, hunting can be detected more accurately.

The hunting suppressing process may be canceled when the reactor current falls outside of the adjustment range. When the reactor current newly changes across the zero value at which its direction is changed, the feedback coefficient is quickly increased, thereby reducing surges developed in the output voltage.

The hunting suppressing process may be canceled when the error increases to a value equal to or greater than a threshold voltage.

The first power device may comprise an electricity storage device, and the second power device may comprise a fuel cell.

Alternatively, the first power device may comprise an electricity storage device, and the second power device may comprise a motor for generating regenerative electric power.

Further alternatively, the first power device may comprise an electricity storage device, and the second power device may comprise a fuel cell and a motor for generating regenerative electric power.

According to the present invention, since surges are reduced, the efficiencies of power devices and a load which are connected to the DC/DC converter are prevented from being lowered. As the withstand voltages of the power devices and the load and the withstand voltages of switching devices of the DC/DC converter do not need to be increased for protection against surges, the costs of the power devices, the load, and the DC/DC converter may be reduced.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A fuel cell vehicle which carries out a method of controlling a DC/DC converter according to an embodiment of the present invention will be described below with reference to the accompanying drawings.

Figure 1:
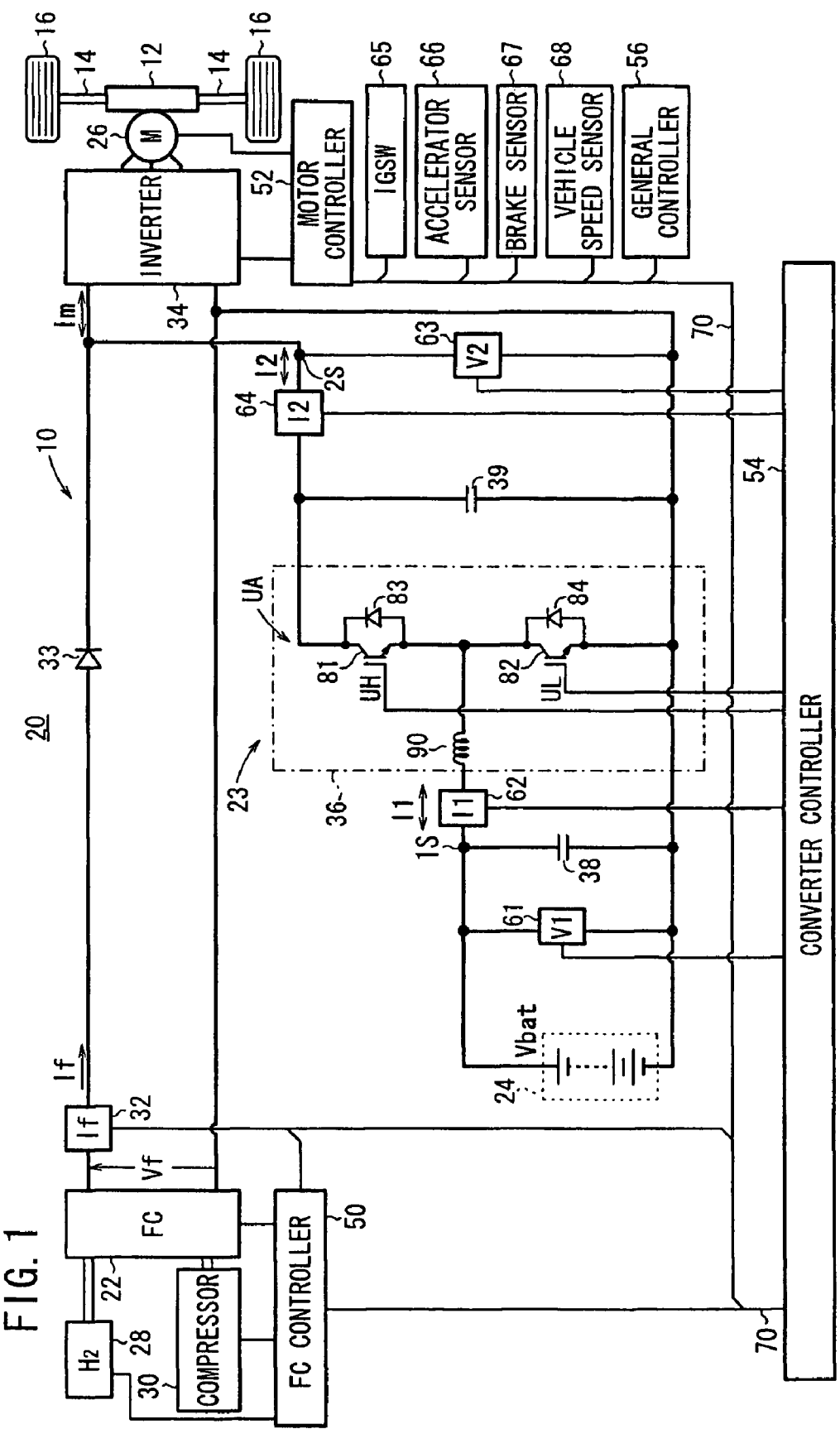
FIG. 1 is a circuit diagram, partly in block form, of a fuel cell vehicle which carries out a method of controlling a DC/DC converter according to an embodiment of the present invention.

FIG. 1 is a circuit diagram, partly in block form, of a fuel cell vehicle 20, which carries out a method of controlling a DC/DC converter according to an embodiment of the present invention.

As shown in FIG. 1, the fuel cell vehicle 20 basically comprises a hybrid power supply system (hybrid DC power supply system) 10 including a fuel cell (FC) 22 functioning as an electric power generating device or a second power device and an electricity storage device (referred to as a "battery") 24 as a first power device, a propulsive motor 26 forming a load that is supplied with a current (electric power) from the hybrid DC power supply system 10 through an inverter 34, and a DC/DC converter apparatus (also referred to as a "VCU (Voltage Control Unit)") 23 for converting voltages between a primary end 1S connected to the battery 24 and a secondary end 2S connected to the fuel cell 22 and the motor 26 (the inverter 34).

The VCU 23 comprises a DC/DC converter 36, and a converter controller 54 that serves as a controller (control device) for energizing switching devices of the DC/DC converter 36.

Rotation of the motor 26 is transmitted through a speed reducer 12 and shafts 14 to wheels 16, thereby rotating the wheels 16.

The fuel cell 22 comprises a stacked structure made up of cells, each of which includes an anode electrode, a cathode electrode, and a solid-state polymer electrolytic membrane sandwiched between the anode and cathode electrodes. The fuel cell 22 is connected to a hydrogen tank 28 and an air compressor 30 by pipes. The fuel cell 22 generates a current If due to an electrochemical reaction between a hydrogen reaction gas (fuel gas) and air (oxygen-containing gas). The generated current If is supplied through a current sensor 32 and a diode (also referred to as a "disconnecting diode") 33 to the inverter 34 and/or the DC/DC converter 36. The fuel cell 22 generates a voltage Vf.

The inverter 34 converts the direct current If into an alternating motor current Im, which is supplied to the motor 26 that operates in a propulsive power mode. The inverter 34 also converts an alternating motor current generated when the motor 26 operates in a regenerative mode into a direct motor current Im, which is supplied from the secondary end 2S to the primary end 1S through the DC/DC converter 36.

A secondary voltage V2, which may be the regenerated voltage in the regenerative mode or the generated voltage Vf across the fuel cell 22, is converted into a low primary voltage V1 by the DC/DC converter 36. Under the low primary voltage V1, a primary current I1 flows as a charging current into the battery 24.

The battery 24, which is connected to the primary end 1S, may comprise a lithium ion secondary battery, or a capacitor. In the present embodiment, the battery 24 comprises a lithium ion secondary battery.

The battery 24 delivers a primary current I1 as a discharging current in order to supply the motor current Im to the inverter 34 through the DC/DC converter 36.

Smoothing capacitors 38, 39 are connected respectively across the primary and secondary ends 1S, 2S.

The fuel cell 22, the hydrogen tank 28, and the air compressor 30 make up a system controlled by an FC controller 50. The inverter 34 and the motor 26 make up a system controlled by a motor controller 52, which includes an inverter driver. The DC/DC converter 36 makes up a system controlled by the converter controller 54, which includes a converter driver.

The FC controller 50, the motor controller 52, and the converter controller 54 are controlled by a general controller 56, which serves as a higher-level controller for determining a total demand load Lt on the fuel cell 22, etc.

Each of the general controller 56, the FC controller 50, the motor controller 52, and the converter controller 54 comprises a CPU, a ROM, a RAM, a timer, input and output interfaces including an A/D converter, a D/A converter, and if necessary, a DSP (Digital Signal Processor), etc.

The general controller 56, the FC controller 50, the motor controller 52, and the converter controller 54 are connected to each other by communication lines 70, such as a CAN (Controller Area Network) serving as an intra-vehicular LAN, and perform various functions by sharing input and output information from various switches and sensors, and by executing programs stored in ROMs under the CPUs based on the input and output information from the various switches and sensors.

The switches and sensors for detecting states of the vehicle include, in addition to the current sensor 32 for detecting the generated current If, a voltage sensor (voltage detector) 61 for detecting a primary voltage V1 equal to a battery voltage Vbat, a current sensor (current detector) 62 for detecting a primary current I1 equal to a battery current Ib (discharging current or charging current), a voltage sensor (voltage detector) 63 for detecting the secondary voltage V2 equal to the generated voltage Vf across the fuel cell 22 when the disconnecting diode 33 is rendered conductive, a current sensor (current detector) 64 for detecting the secondary current I2, an ignition switch (IGSW) 65, an accelerator sensor 66, a brake sensor 67, and a vehicle speed sensor 68, etc., all of which are connected to the communication lines 70.

The general controller 56 determines a total demand load Lt on the fuel cell vehicle 20 based on the state of the fuel cell 22, the state of the battery 24, the state of the motor 26, the state of accessories (not shown), and the input signals from the switches and sensors (load demands), determines shares of a fuel cell allocated load (demand output) Lf to be allocated to the fuel cell 22, a battery allocated load (demand output) Lb to be allocated to the battery 24, and a regenerative power supply allocated load (demand output) Lr to be allocated to the regenerative power supply, through an arbitration process based on the total demand load Lt, and sends commands indicative of the determined shares to the FC controller 50, the motor controller 52, and the converter controller 54.

The DC/DC converter 36 comprises a phase arm (single-phase arm) UA disposed between the battery 24 and the fuel cell 22 or the regenerative power supply (the inverter 34 and the motor 26). The phase arm UA is made up of an upper arm assembly including an upper arm switching device 81 and a diode 83, and a lower arm assembly including a lower arm switching device 82 and a diode 84. Alternately, the DC/DC converter 36 may comprise a plural-phase arm, e.g., a two-phase or three-phase arm.

The upper arm switching device 81 and the lower arm switching device 82 each comprises a MOSFET, an IGBT, or the like.

A single reactor 90 for discharging and storing energy at the time the DC/DC converter 36 converts between the primary voltage V1 and the secondary voltage V2 is inserted between the battery 24 and the midpoint (junction) of the phase arm UA.

The upper arm switching device 81 is turned on by a gate drive signal (drive voltage) UH, which is output from the converter controller 54 when the gate drive signal UH is high in level. The lower arm switching device 82 is turned on by a gate drive signal (drive voltage) UL, which is output from the converter controller 54 when the gate drive signal UL is high in level.

Figure 2:
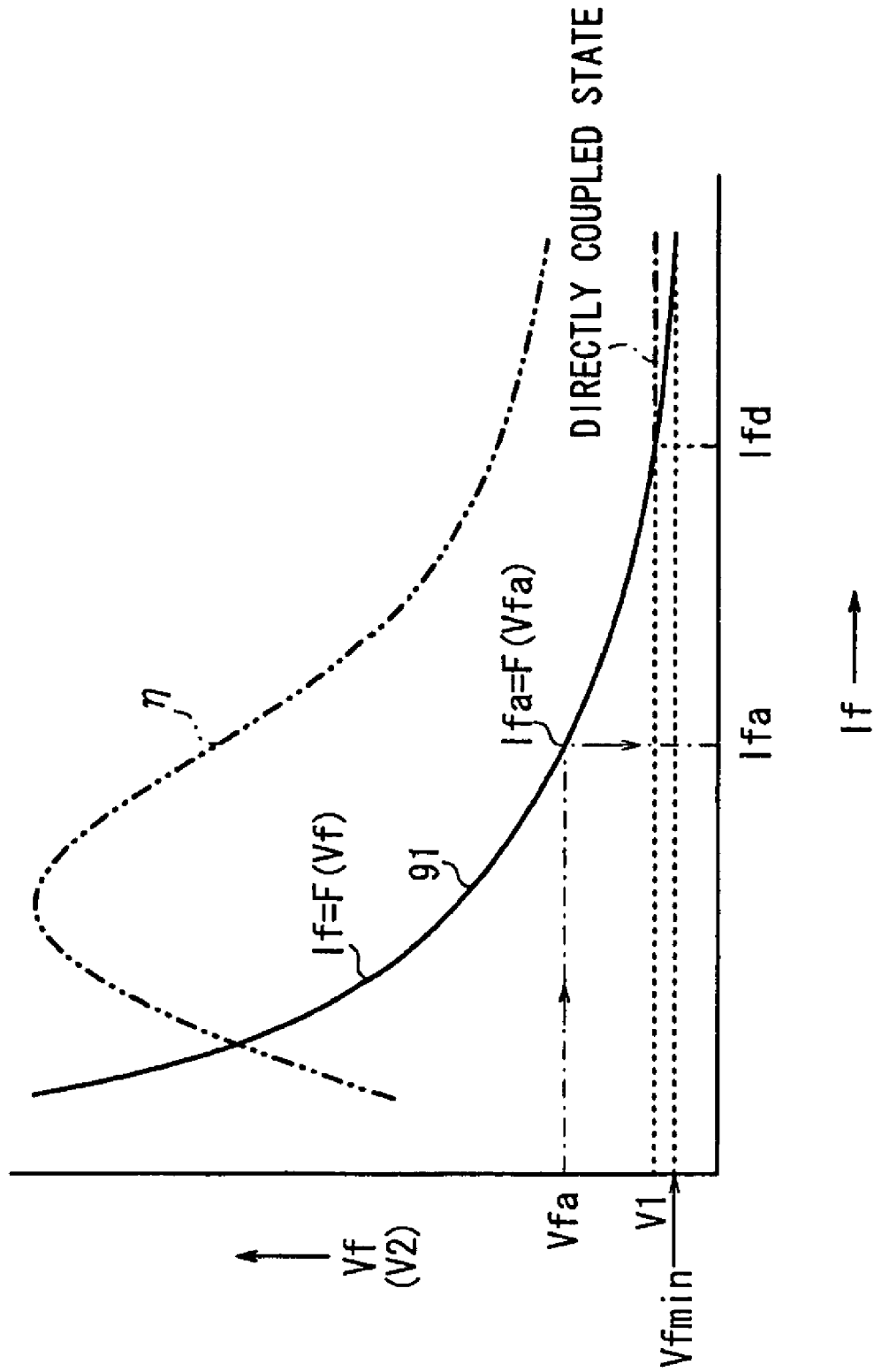
FIG. 2 is a diagram showing current-voltage characteristics of a fuel cell.

The primary voltage V1, typically the open circuit voltage OCV (Open Circuit Voltage) across the battery 24 at a time when a load is not connected to the battery 24, is set to a voltage higher than the minimum voltage Vfmin of the generated voltage Vf of the fuel cell 22, as indicated by the fuel cell output characteristic curve (current-voltage characteristic curve) 91 shown in FIG. 2. In FIG. 2, OCV≈V1.

The secondary voltage V2 is equal to the generated voltage Vf of the fuel cell 22 while the fuel cell 22 generates electric power.

The output control process performed on the fuel cell 22 by the VCU 23 will be described below.

When the fuel cell 22 generates electric power while the fuel cell 22 is being supplied with fuel gas from the hydrogen tank 28 and compressed air from the air compressor 30, the generated current If of the fuel cell 22 is determined by the converter controller 54 as a result of setting the secondary voltage V2, i.e., the generated voltage Vf, through the DC/DC converter 36 on the characteristic curve 91, also referred to as "function F(Vf)", as shown in FIG. 2. The generated current If is determined as a function F(Vf) value of the generated voltage Vf. Since If=F(Vf), if the generated voltage Vf is set to Vf=Vfa=V2, the generated current Ifa is determined as a function of the generated voltage Vfa(V2) according to the equation Ifa=F(Vfa)=F(V2).

Specifically, when the generated voltage Vf from the fuel cell 22 decreases, the generated current If flowing from the fuel cell 22 increases. Conversely, when the generated voltage Vf increases, the generated current If decreases.

Inasmuch as the generated current If of the fuel cell 22 is determined when the secondary voltage V2 (the generated voltage Vf) is determined, the secondary voltage V2 (the generated voltage Vf) at the secondary end 2S of the DC/DC converter 36 is normally set to a target voltage (target value), i.e., a control voltage, for enabling the feedback control process to be performed by the VCU 23 including the converter controller 54, in the system including the fuel cell 22, such as the fuel cell vehicle 20. In other words, the VCU 23 controls the output (generated current If) of the fuel cell 22. The output control process performed on the fuel cell 22 by the VCU 23, or stated otherwise, a secondary voltage control process (V2 control process) has been described above.

In order to protect the battery 24 by limiting the charging and discharging currents thereof, the output control process performed on the fuel cell 22 by the VCU 23 is interrupted, and the current that flows through the DC/DC converter 36, i.e., the secondary current I2 or the primary current I1, is controlled. The VCU 23 also is capable of controlling the primary voltage V1.

Basic operations of the DC/DC converter 36, which is controlled by the converter controller 54, will be described below with reference to FIG. 3.

As described above, the general controller 56 determines a total demand load Lt on the fuel cell vehicle 20 based on the state of the fuel cell 22, the state of the battery 24, the state of the motor 26, the state of various auxiliaries (not shown), and input signals from the switches and sensors (load demands). The general controller 56 then determines the shares of a fuel cell allocated load (demand output) Lf to be allocated to the fuel cell 22, a battery allocated load (demand output) Lb to be allocated to the battery 24, and a regenerative power supply allocated load Lr to be allocated to the regenerative power supply, through an arbitration process, based on the total demand load Lt. The general controller 56 sends commands indicative of the determined shares to the FC controller 50, the motor controller 52, and the converter controller 54.

Figure 3:
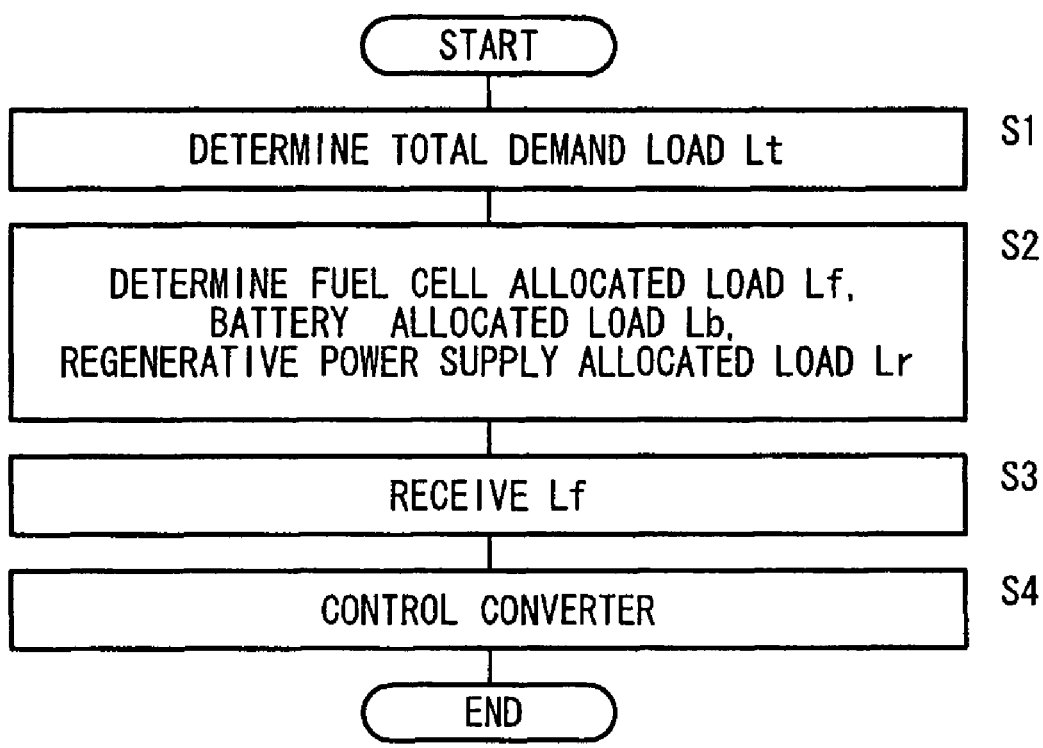
FIG. 3 is a flowchart of a basic control sequence of the DC/DC converter.

In step S1 shown in FIG. 3, the general controller 56 determines (calculates) a total demand load Lt from the power demand of the motor 26, the power demand of auxiliaries, and the power demand of the air compressor 30, all of which represent load demands. In step S2, the general controller 56 determines the shares of a fuel cell allocated load Lf, a battery allocated load Lb, and a regenerative power supply allocated load Lr, for outputting the determined total demand load Lt, and sends commands indicative of the determined shares to the FC controller 50, the motor controller 52, and the converter controller 54. When the general controller 56 determines the fuel cell allocated load Lf, the general controller 56 takes the efficiency η of the fuel cell 22 into account.

Next, in step S3, the fuel cell allocated load Lf (essentially including a command value V2com for the generated voltage Vf to be directed to the converter controller 54) as determined by the general controller 56 is transmitted as a command through the communication lines 70 to the converter controller 54. In response to the command of the fuel cell allocated load Lf, the converter controller 54 controls duty ratios for driving the upper and lower arm switching devices 81, 82 of the DC/DC converter 36, i.e., the on-duty ratios of the gate drive signals UH, UL, in order to bring the secondary voltage V2, i.e., the generated voltage Vf of the fuel cell 22, into conformity with the command value V2com from the general controller 56.

The secondary voltage V2 (or the primary voltage V1) is controlled by the converter controller 54 while the converter controller 54 also controls the DC/DC converter 36 in the PID operation, based on a combination of a feed-forward control process and a feedback control process.

In response to commands from the general controller 56, the FC controller 50 and the motor controller 52 also perform respective processing sequences.

The FC controller 50, the converter controller 54, and the motor controller 52 report results of their respective control processes to the general controller 56, from time to time.

So that the fuel cell vehicle 20 can smoothly respond to the user's actions, such as an action on the accelerator pedal, without causing the user to feel strange or uncomfortable, the general controller 56 may include a processing period, which is longer than the processing period of the converter controller 54, the switching period of which is about 50 μS. For example, the processing period of the general controller 56 may be set to a value in a range from 1 to 1000 mS, whereas the processing period of the converter controller 54 is set to a value in a range from 1 to 1000 μS, for example.

The converter controller 54 energizes the DC/DC converter 36 in a voltage increasing mode or a voltage reducing mode, as described below.

Figure 4:
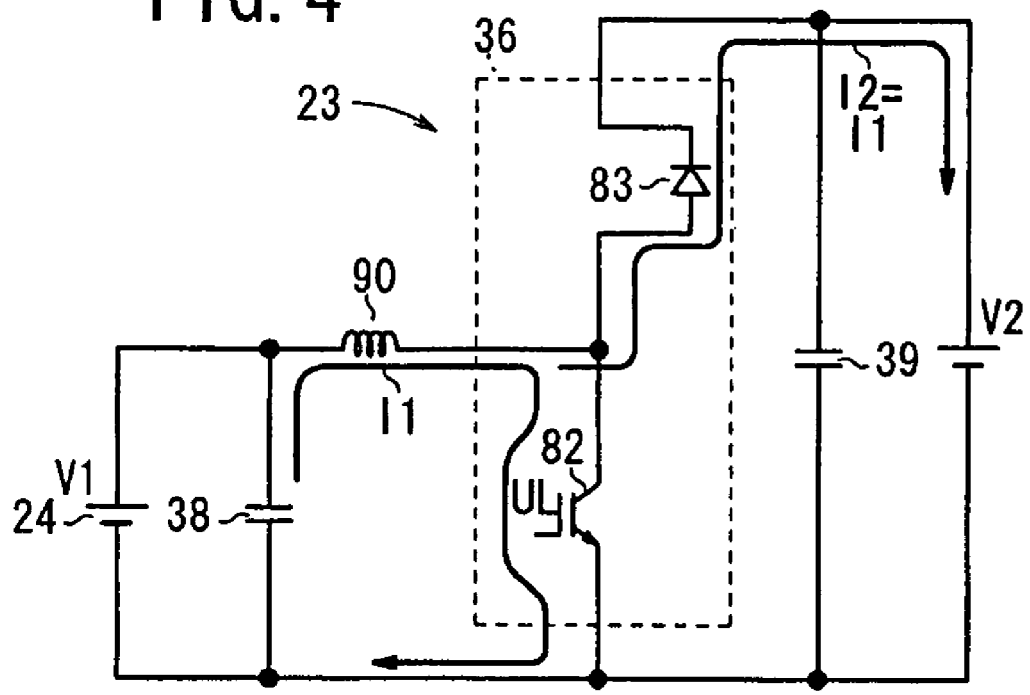
FIG. 4 is a schematic circuit diagram illustrative of a voltage increasing mode (propulsive mode) of the DC/DC converter.
Figure 5:
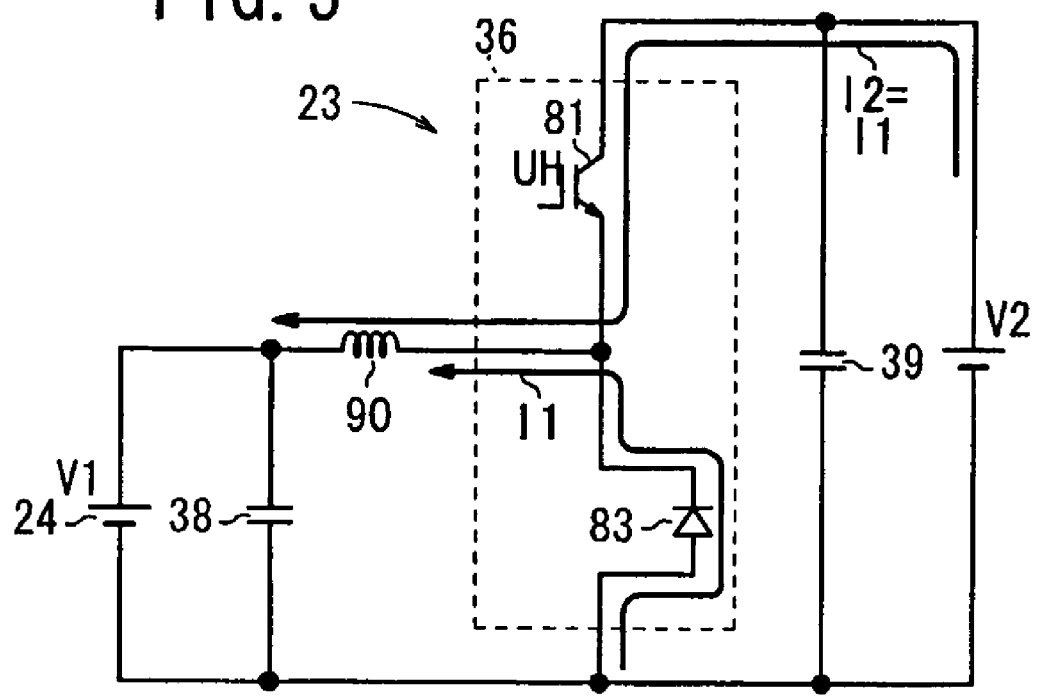
FIG. 5 is a schematic circuit diagram illustrative of a voltage reducing mode (regenerative mode) of the DC/DC converter.

FIGS. 4 and 5 are schematic circuit diagrams illustrative of a voltage increasing mode (propulsive mode, assistive mode) and a voltage reducing mode (regenerative mode), respectively, of the DC/DC converter 36.

Figure 6:
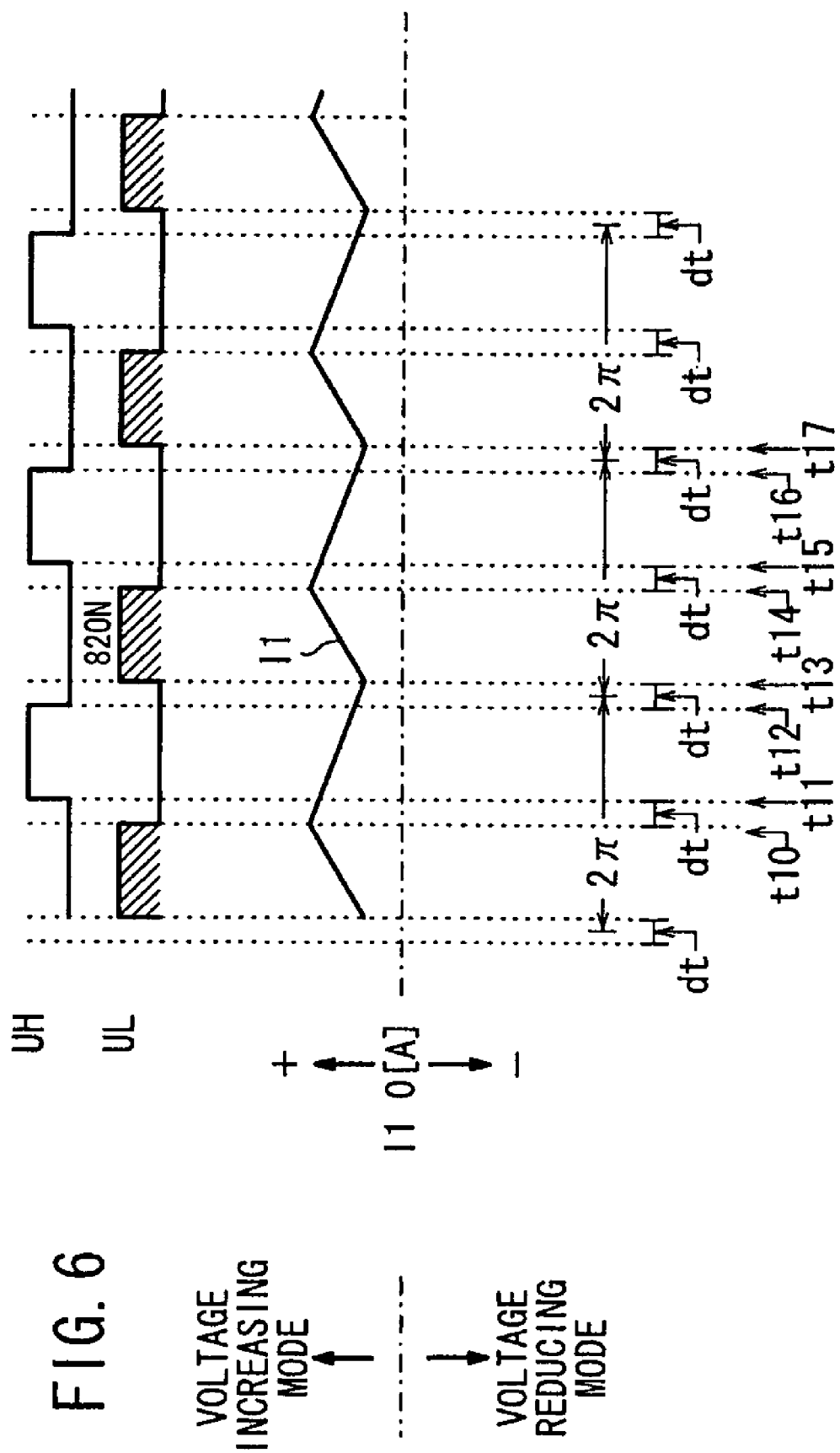
FIG. 6 is a waveform diagram illustrative of the voltage increasing mode (propulsive mode) of the DC/DC converter.
Figure 7:
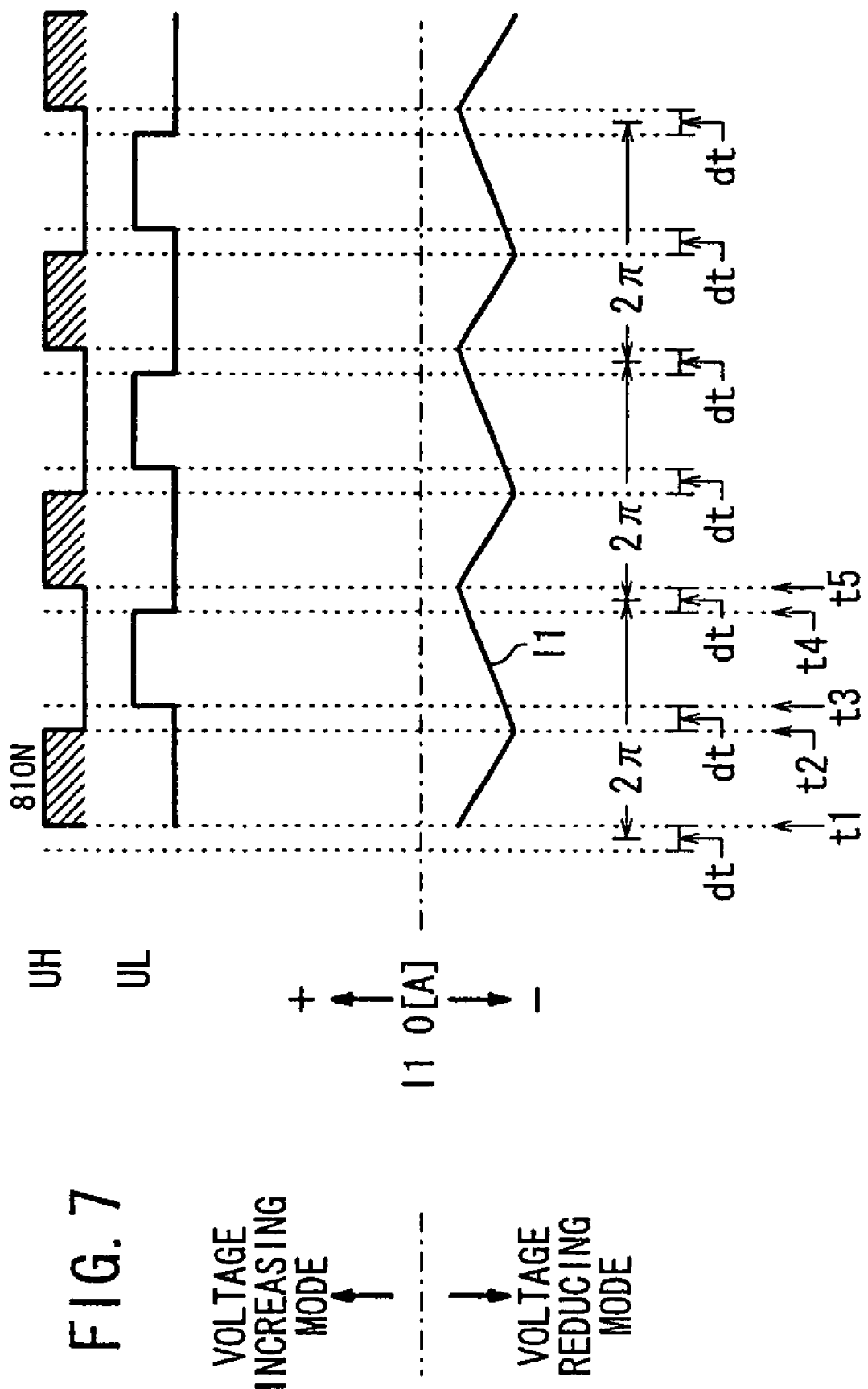
FIG. 7 is a waveform diagram illustrative of the voltage reducing mode (regenerative mode) of the DC/DC converter.

FIGS. 6 and 7 are waveform diagrams illustrative of the voltage increasing mode and the voltage reducing mode, respectively.

In the voltage increasing mode, for causing the secondary current I2 to flow from the secondary end 2S of the DC/DC converter 36 to the inverter 34, i.e., in the voltage increasing mode for causing a current to pass from the battery 24 (primary end 1S) to the motor 26 (secondary end 2S), in step S4, the converter controller 54 turns on the lower arm switching device 82 at time t13, for example, as shown in FIGS. 4 and 6. Energy is stored in the reactor 90 due to the primary current I1 discharged from the battery 24 between time t13 and time t14, and at the same time, the secondary current I2 flows from the capacitor 39 to the inverter 34.

Then, the converter controller 54 turns off the lower arm switching device 82 at time t14. The energy stored in the reactor 90 at time t14 flows as the primary current I1 (discharging current) through the diode 83, thereby storing energy in the capacitor 39, while also flowing as the secondary current I2 into the inverter 34.

From time t17, the operation after time t13 is repeated. The lower arm switching device 82 and the upper arm switching device 81 are switched, alternately or synchronously, once within a period of 2π (50 μS), with a dead time dt being inserted therein. In the voltage increasing mode, the upper arm switching device 81 is not turned on. The drive duty ratio (on-duty ratio) of the lower arm switching device 82 is determined so as to maintain the output voltage V2 in conformity with the command voltage Vcom.

In the voltage increasing mode, as described above, the lower arm switching device 82 controls the current flowing through the reactor 90 (reactor current) to control the secondary voltage v2.

In the voltage reducing mode, during which current (charging current) is caused to flow from the secondary end 2S of the DC/DC converter 36 to the battery 24 connected to the primary end 1S in step S4, the converter controller 54 turns on the upper arm switching device 81 at time t1, as shown in FIGS. 5 and 7, in order to store energy in the reactor 90 with the generated current If from the fuel cell 22, the secondary current I2 due to the regenerated current from the inverter 34, and the current output from the capacitor 39, while at the same time charging the capacitor 38 and supplying the charging current to the battery 24.

When the upper arm switching device 81 is turned off at time t2, the energy stored in the reactor 90 is supplied as the charging current through a loop, including the battery 24 and the diode 84, to the battery 24. Further, the electric charges stored in the capacitor 38 are supplied as part of the charging current to the battery 24 (the capacitor 38 is discharged).

If a regenerated voltage exists in the motor 26, then a regenerated current due to the regenerative power supply allocated load Lr is added to the secondary current I2, which flows from the secondary end 2S of the DC/DC converter 36 through the DC/DC converter 36 in the voltage reducing mode. In the voltage reducing mode, the on-duty ratios of the upper arm switching device 81 and the lower arm switching device 82 also are controlled in order to maintain the secondary voltage V2 in conformity with the command value V2com.

In the voltage reducing mode, as described above, the upper arm switching device 81 controls the current flowing through the reactor 90 (reactor current) to control the secondary voltage V2.

In the present embodiment, during each processing period ($3\times2\pi$), which is three times the switching period $2\pi$ (corresponding to the time of the reciprocal (e.g., about $1/20$ kHz$\approx$50 $\mu$S) of the switching frequency), the converter controller 54 determines an operation sequence of the DC/DC converter 36, i.e., a converter control sequence in step S4, which shall be performed during a subsequent period of $3\times2\pi$.

In FIGS. 6 and 7, the primary current I1 flowing through the reactor 90 has a positive (+) sign when the primary current I1 flows as the discharging current from the primary end 1S to the secondary end 2S, in the voltage increasing mode (current flows from the secondary end 2S of the DC/DC converter 36 to the inverter 34). Further, the primary current I1 has a negative sign (−) when the primary current I1 flows as the charging current from the secondary end 2S to the primary end 1S in the voltage reducing mode (current flows from the fuel cell 22 or the inverter 34 to the secondary end 2S of the DC/DC converter 36).

Among the waveforms of the gate drive signals UH, UL, which are output from the converter controller 54, periods thereof that are shown in cross-hatching represent periods in which the upper and lower arm switching devices 81, 82, which are supplied with the gate drive signals UH, UL, are actually turned on, i.e., currents flow through the upper and lower arm switching devices 81, 82.

The basic operation of the DC/DC converter 36, which is controlled by the converter controller 54, has been described above.

Figure 8:
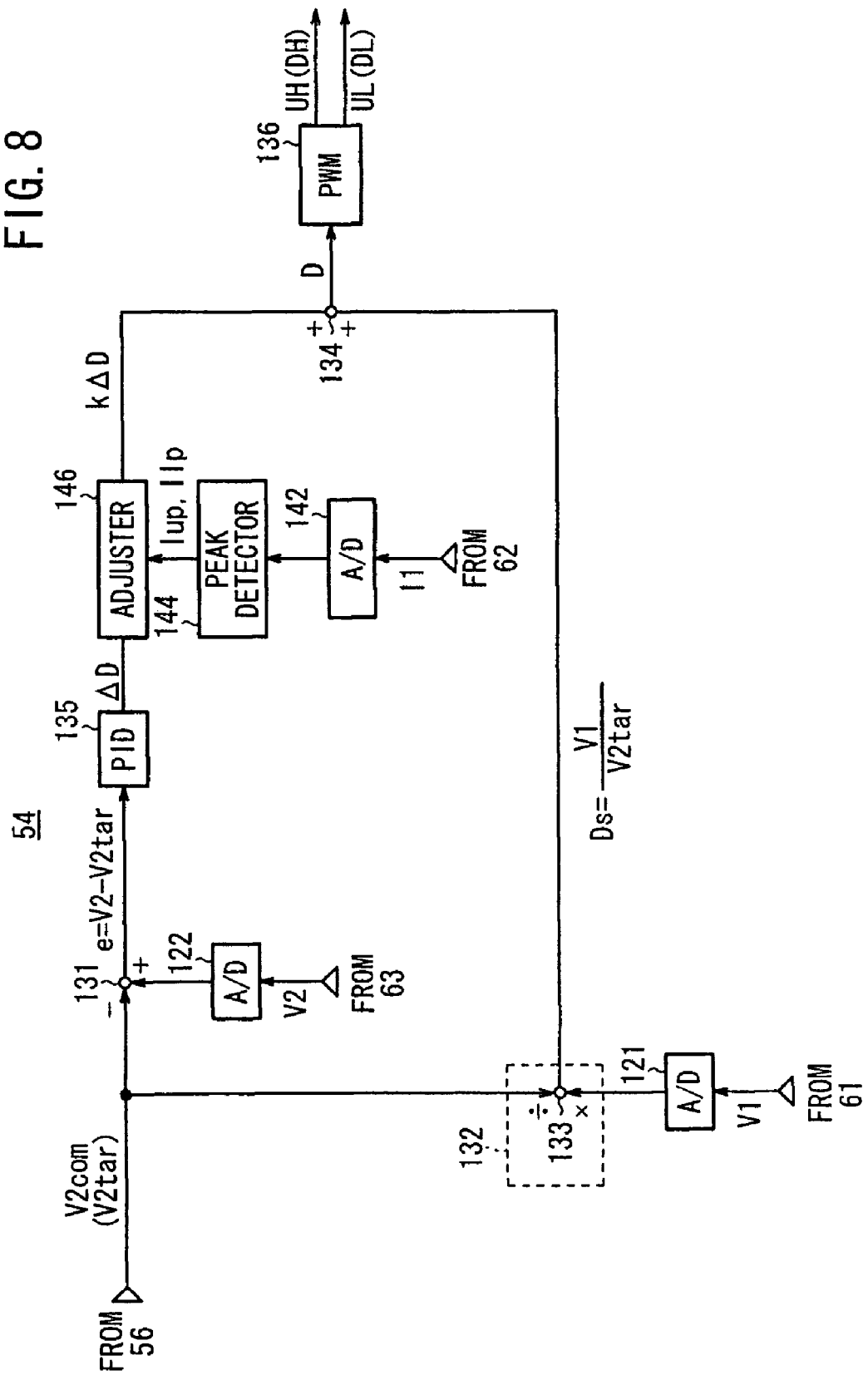
FIG. 8 is a functional block diagram of a converter controller which is in a secondary voltage control mode.

FIG. 8 is a functional block diagram of the converter controller 54 which is in a secondary voltage control mode (V2 control mode) with a voltage control target value V2tar.

In the V2 control mode, the secondary voltage command value V2com calculated by the general controller 56 is supplied as a subtraction signal (subtrahend signal) to a calculating point 131 (subtractor), and also as a division signal to a calculating point 133 of a feed-forward unit 132. The secondary voltage command value V2com is used as the secondary voltage control target value V2tar (V2tar=V2com).

A secondary voltage V2 (control voltage) detected (measured) by the voltage sensor 63 is supplied as an addition signal (minuend signal) to the calculating point 131 through an A/D converter 122.

A primary voltage V1 detected (measured) by the voltage sensor 61 is supplied as a multiplication signal (multiplier signal) to the calculating point 133 (ratio generator) through an A/D converter 121.

An error e (e=V2−V2tar) output from the calculating point 131 is supplied to a feedback unit 135.

The feedback unit 135, which operates as a proportional (P), integral (I) and derivative (D) unit, converts the error e into a corrective duty ratio $\Delta D$, which serves as a corrective value for the duty ratio. Then, an adjuster 146 adjusts the corrective duty ratio $\Delta D$ by multiplying it by an adjustment coefficient k ($k \geq 1$), and supplies the adjusted corrective duty ratio $k\Delta D$ as an addition signal to one of the input terminals of a calculating point 134 (adder). The feedback unit 135 may function as at least a proportional (P) unit.

The corrective duty ratio $\Delta D$ is represented by the sum of a corrective duty ratio $\Delta Dp$ in the form of a P-term component, a corrective duty ratio $\Delta Di$ in the form of an I-term component, and a corrective duty ratio $\Delta Dd$ in the form of a D-term component. The corrective duty ratio $\Delta D$ is thus expressed by the following equation (1):

$$\Delta D = \Delta Dp + \Delta Di + \Delta Dd \qquad (1)$$
$$= Kp \times e + Ki \times \int e\, dt + Kd \times \left(\frac{de}{dt}\right)$$

where Kp represents a proportional-term feedback coefficient with respect to the error e, Ki an integral-term feedback coefficient with respect to the error e, and Kd a derivative-term feedback coefficient with respect to the error e.

The adjusted corrective duty ratio $k\Delta D$ is expressed by the following equation (2) which is produced by multiplying both sides of the equation (1) by an adjustment coefficient k:

$$k\Delta D = k(\Delta Dp + \Delta Di + \Delta Dd) \qquad (2)$$
$$= kKp \times e + kKi \times \int e\, dt + kKd \times \left(\frac{de}{dt}\right)$$

A primary current I1, which is a reactor current detected by the current sensor 62, is supplied to a peak detector 144 through an A/D converter 142.

For the sake of brevity, the feedback coefficients Kp, Ki, Kd before they are adjusted will also be referred to as a "feedback coefficient Kf", and the feedback coefficients kKp, kKi, kKd after they are adjusted will also be referred to as a "feedback coefficient kKf".

The peak detector 144 detects upper peaks Iup and lower peaks Ilp of the reactor current which is of a triangular waveform, and supplies the detected peaks to a control input terminal of the adjuster 146.

Figure 9:
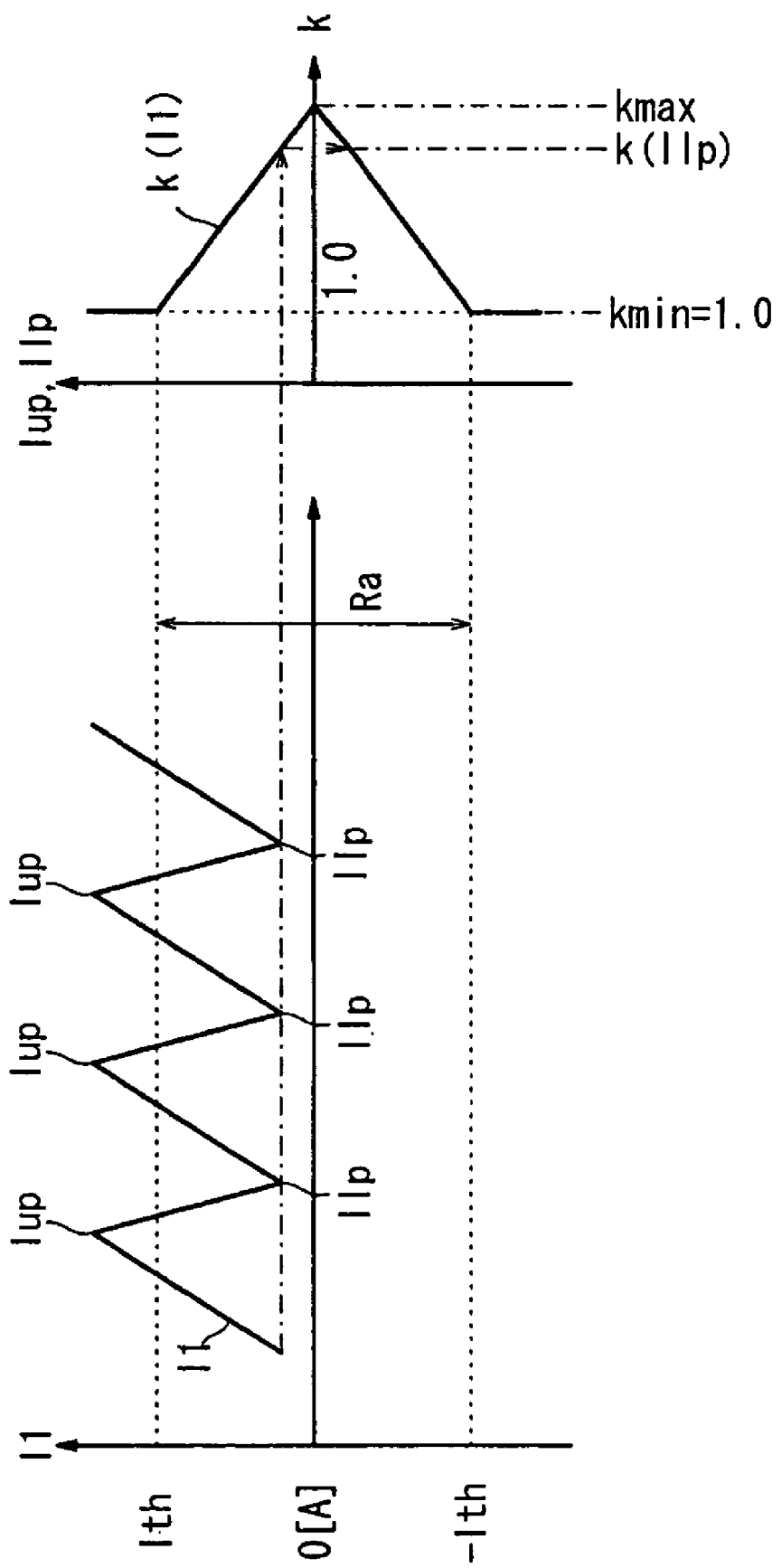
FIG. 9 is a diagram illustrative of a process of calculating an adjustment coefficient.

As shown in a left portion of FIG. 9, the adjuster 146 outputs the adjusted corrective duty ratio $k\Delta D=k\{Kp\times e+Ki\times \int e\,dt+Kd\times(de/dt)\}$, which is produced by multiplying both sides of the equation (1) by the adjustment coefficient k for increasing the feedback coefficient Kf when the upper peaks Iup and (or) the lower peaks Ilp fall within an adjustment range Ra of 0 [A]±Ith (Ith represents a threshold value).

As shown in a right portion of FIG. 9, the adjustment coefficient k is expressed by a triangular characteristic curve (function) k=k(I1). Specifically, when the upper peaks Iup of the primary current I1 is out of the adjustment range Ra, the adjustment coefficient k has a value of 1.0 {k(I1)=kmin=1.0}, i.e., the feedback coefficient Kf in the feedback unit 135 is used without adjustment, and when the upper peaks Iup of the primary current I1 fall within the adjustment range Ra, the adjustment coefficient k is of a value which progressively becomes greater as the peaks Iup, Ilp are closer to 0 [A]. When the primary current I1 is 0 [A], the adjustment coefficient k is of the maximum value kmax (k(I1)=k(0)=kmax). The adjustment coefficient k may have different values for the proportional term, the integral term, and the derivative term. Also, the adjustment coefficient k may be set to an optimum value by way of simulation or experimentation.

As shown in FIG. 8, the other input terminal of the calculating point 134 is supplied with a reference duty ratio Ds (Ds=V1/V2tar) from the calculating point 133.

A PWM (Pulse Width Modulation) processor 136 is supplied with a drive duty ratio D which is represented by the sum of the reference duty ratio Ds and the adjusted corrective duty ratio kΔD (D=Ds+kΔD=V1/V2tar+kΔD).

Based on the drive duty ratio D, the PWM processor 136 supplies the upper arm switching device 81 with the drive signal UH which is expressed as a drive duty ratio DH {(DH=V1/V2tar+kΔD−dtD) . . . (1)}, and also supplies the lower arm switching device 82 with the gate drive signal UL which is expressed as a drive duty ratio DL [{DL=1−(V1/V2tar+kΔD−dtD)} . . . (2)], where dtD represents a duty ratio corresponding to the dead time.

Problems of a Comparative Example

Voltage fluctuations which the secondary voltage V2 serving as the control voltage suffers when the primary current I1 changes across 0 [A] in the V2 control mode according to a comparative example at the time the adjuster 146 makes no adjustment (k=1.0: constant, ΔD=kΔD) will be described below.

Figure 10:
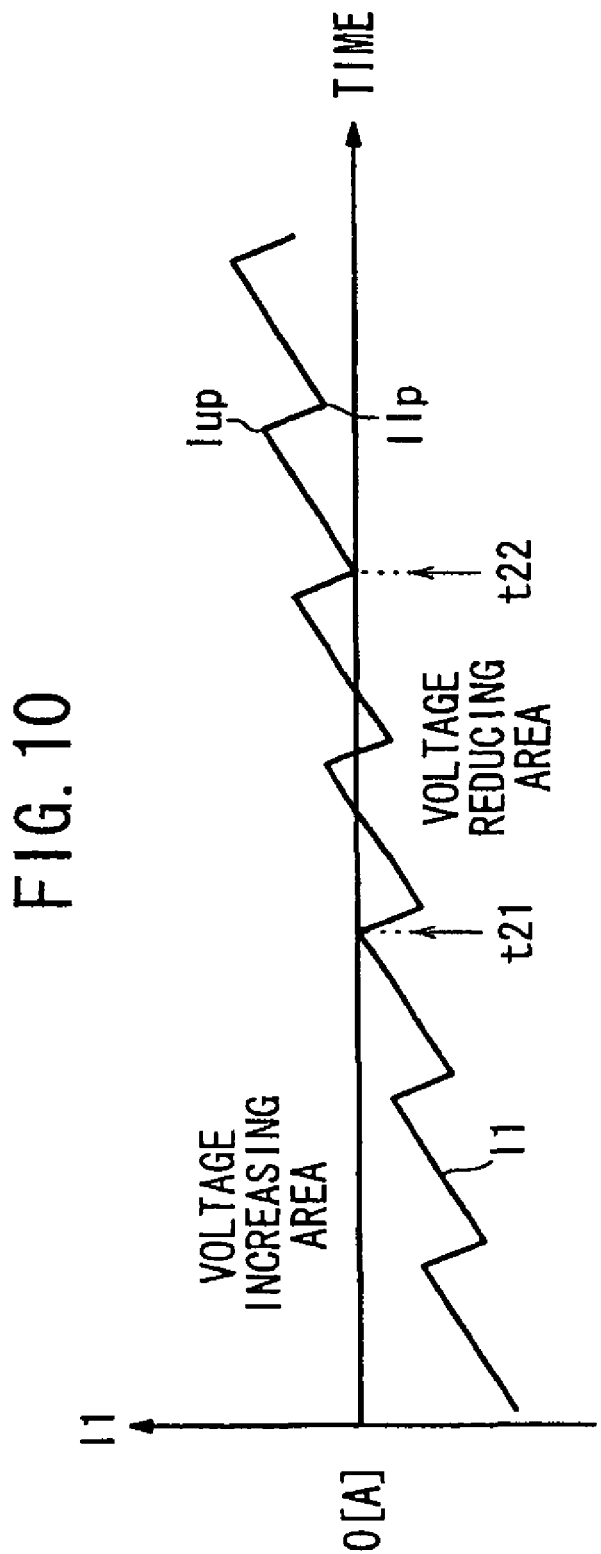
FIG. 10 is a diagram showing the manner in which peaks of a primary current change across a zero value from a voltage reducing area to a voltage increasing area.

FIG. 10 shows the waveform of the primary current I1. In the waveform shown in FIG. 10, the upper peaks Iup of the primary current I1 change across 0 [A] at time t21 as they enter from a voltage reducing area into a voltage increasing area, and the lower peaks Ilp of the primary current I1 change across 0 [A] at time t22 as they enter from the voltage reducing area into the voltage increasing area.

Figure 11:
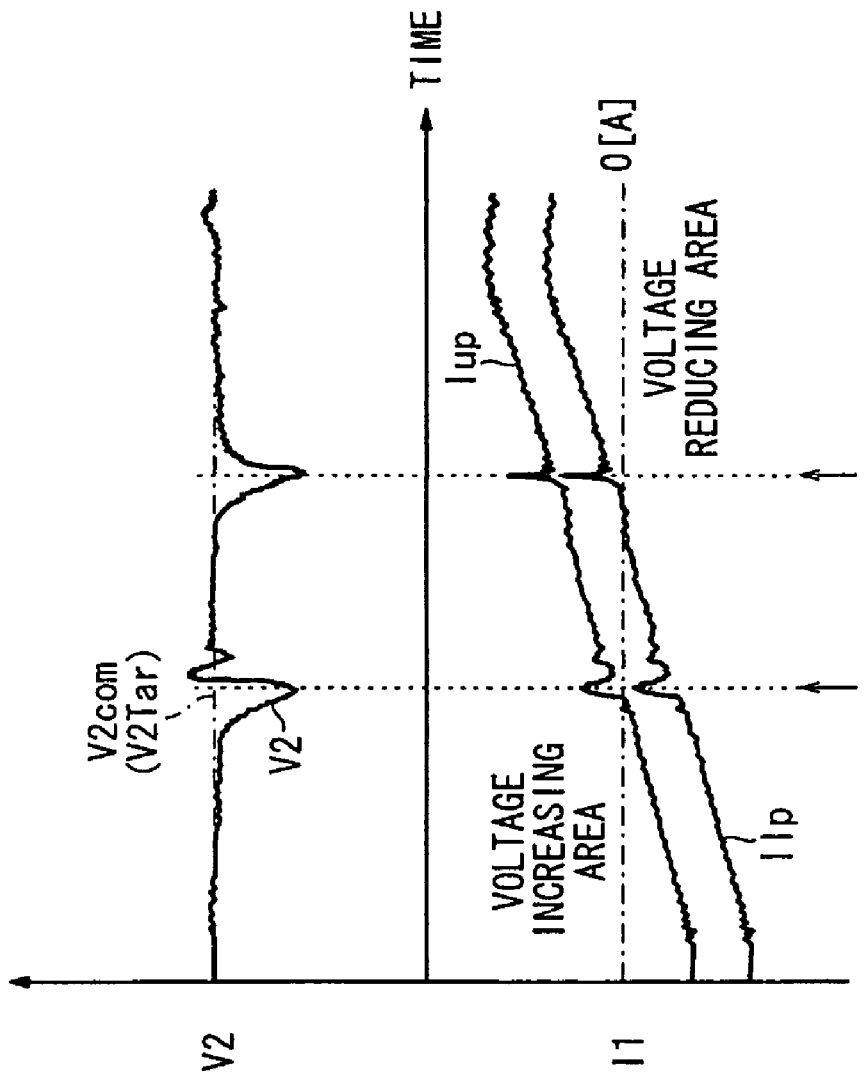
FIG. 11 is a diagram showing surges which are developed when the peaks of the primary current change across the zero value from the voltage reducing area to the voltage increasing area.

FIG. 11 shows in its lower portion how the primary current I1 changes with time. The lower portion of FIG. 11 shows upper peaks Iup and lower peaks Ilp indicated by envelops of the actual upper peaks Iup and lower peaks Ilp of the primary current I1 according to the comparative example. FIG. 11 shows in its upper portion how the secondary voltage V2 changes with time. The upper portion of FIG. 11 shows an actual waveform of the secondary voltage V2 according to the comparative example. As can be seen from FIG. 11, when the upper peaks Iup of the primary current I1 change across 0 [A] at time t21 (see also FIG. 10) as they enter from the voltage reducing area into the voltage increasing area, a surge is developed in the secondary voltage V2. In other words, though the secondary voltage command value V2com (secondary voltage target value V2Tar) is constant, a surge is developed in the secondary voltage V2. Similarly, also when the lower peaks Ilp of the primary current I1 change across 0 [A] at time t22 (see also FIG. 10) as they enter from the voltage reducing area into the voltage increasing area, a surge is developed in the secondary voltage V2 though the secondary voltage command value V2com (secondary voltage target value V2Tar) is constant.

When the secondary voltage V2 is of several hundreds [V], the surge voltage developed in the secondary voltage V2 is of about several tens [V], and the surge current developed in the primary current I1 is of about several tens [A].

The cause of the surge voltage will be described below.

Figure 12:
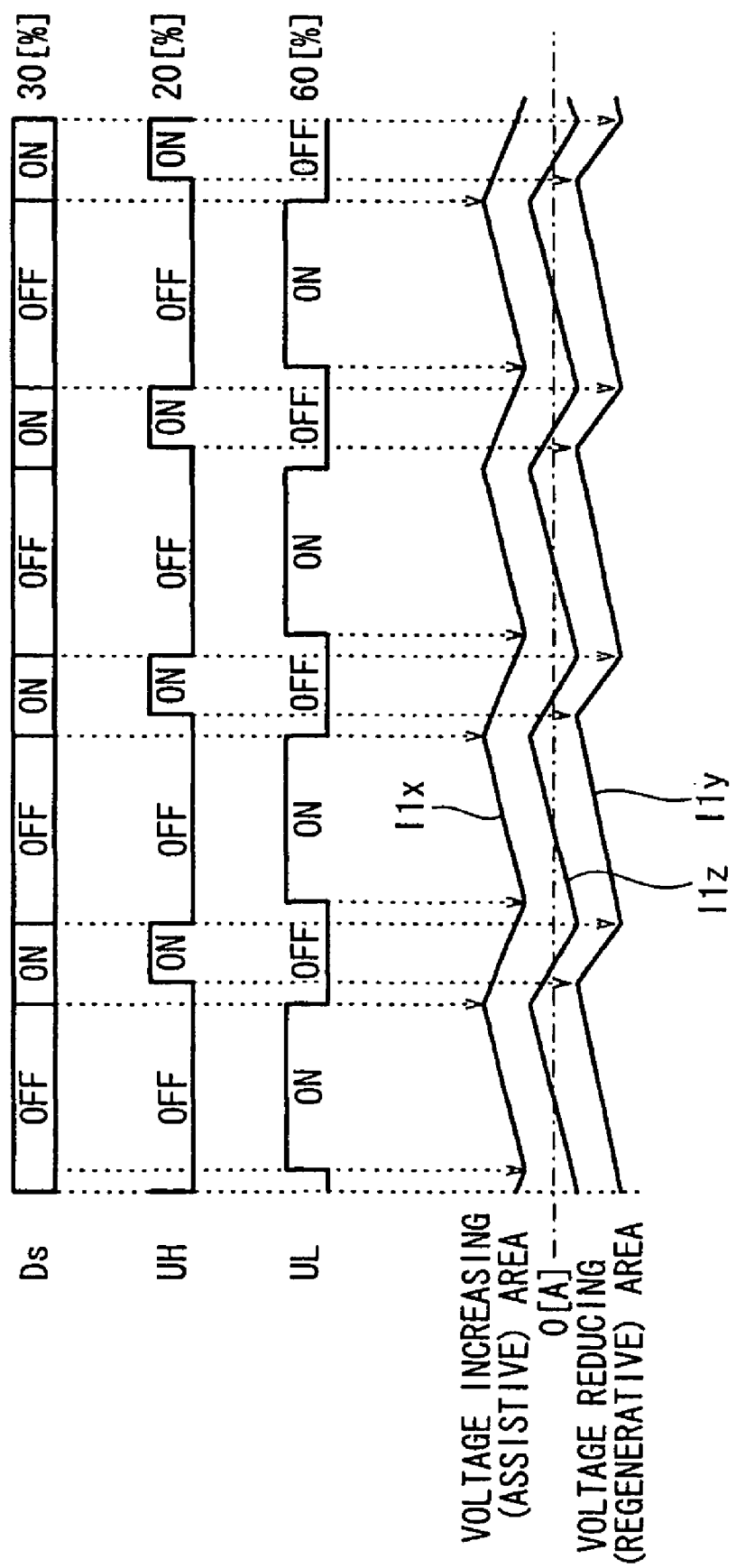
FIG. 12 is a diagram illustrative of a mechanism by which surges are developed.

As shown in FIG. 12, when the reference duty ratio Ds (Ds=V1/V2com=V1/V2tar) corresponding to the secondary voltage command value V2com is of 30%, for example, since the dead time is of about 10%, the gate drive signal UH for the upper arm switching device 81 has an on duty ratio of 20% (=30%−10%), and the gate drive signal UL for the lower arm switching device 82 has an on duty ratio of 60% (=100%−30%−10%).

In the voltage increasing area (assistive area), the primary current I1 is represented by a triangular-wave primary current I1x which changes according to the gate drive signal UL which is turned on and off. In the voltage reducing area, the primary current I1 is represented by a triangular-wave primary current I1y which changes according to the gate drive signal UH which is turned on and off. When the primary current I1 changes between the voltage increasing area and the voltage reducing area across 0 [A], the primary current I1 is represented by a triangular-wave primary current I1z. However, due to the influence of the dead time, the substantial duty ratio changes depending on whether the primary current I1z is in the voltage increasing area or the voltage reducing area even though the reference duty ratio Ds is constant, and the secondary voltage V2 as the control voltage changes as shown in FIG. 11 due to the changing duty ratio.

Figure 13:
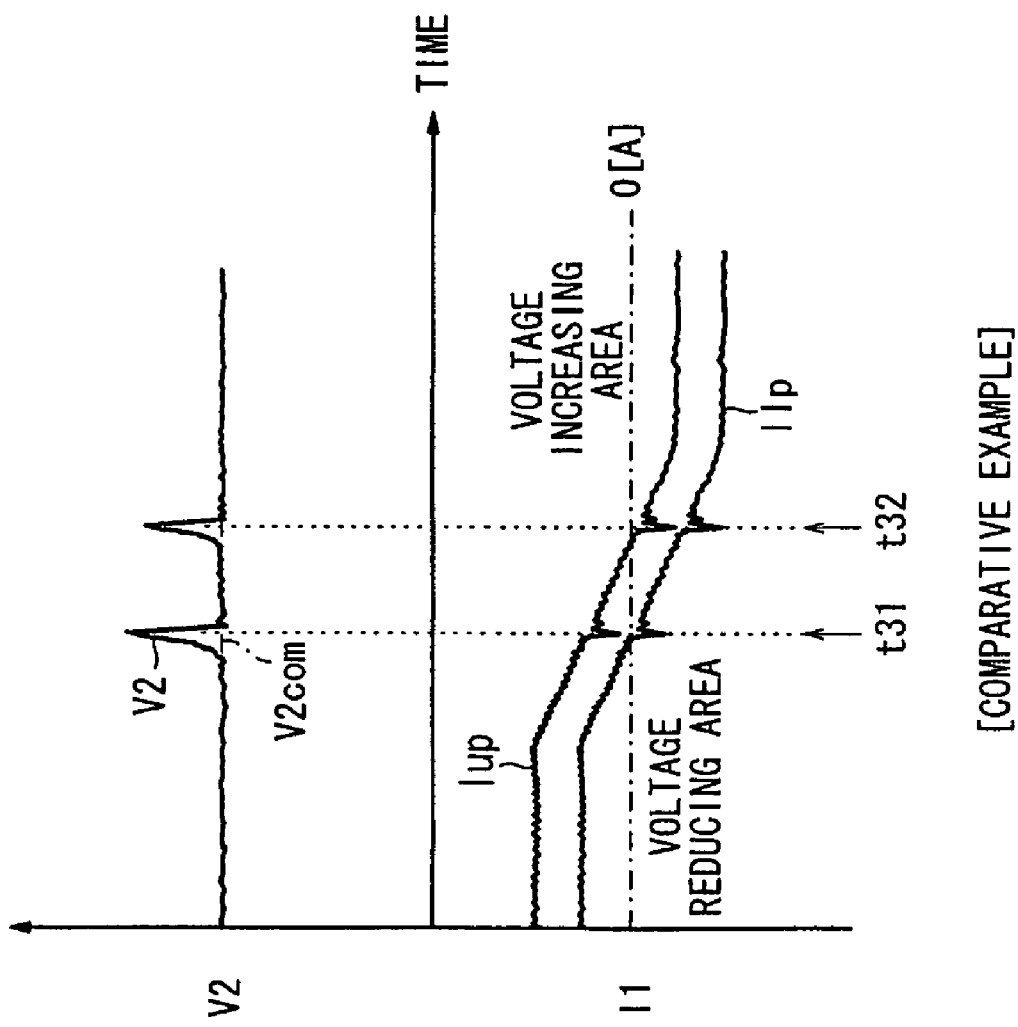
FIG. 13 is a diagram showing surges which are developed when peaks of a primary current change across a zero value from a voltage increasing area to a voltage reducing area.

FIG. 13 shows in its lower portion envelops of the actual upper peaks Iup and lower peaks Ilp of the primary current I1 according to the related art, and also shows in its upper portion an actual corresponding waveform of the secondary voltage V2 according to the related art. As can be seen from FIG. 13, when the lower peaks Ilp of the primary current I1 change across 0 [A] at time t31 as they enter from the voltage increasing area into the voltage reducing area, and when the upper peaks Iup of the primary current I1 change across 0 [A] at time t32 as they enter from the voltage increasing area into the voltage reducing area, surges are developed in the secondary voltage V2 though the secondary voltage command value V2com (secondary voltage target value V2Tar) is constant, in the same manner as described above with reference to FIG. 11.

The surges developed in the secondary voltage V2 serving as the control voltage, or stated otherwise, the voltage fluctuations which the secondary voltage V2 suffers, are burdensome to the inverter 34, the fuel cell 22, the upper arm switching device 81, the diode 83, etc. of the DC/DC converter 36. Therefore, components used needs to have high withstand voltages, and the operation efficiency of the fuel cell vehicle is reduced.

The problems of the comparative example have been described above.

According to the present embodiment, as described above with reference to FIG. 9, the adjuster 146 outputs the adjusted corrective duty ratio kΔD=k{Kp×e+Ki×∫edt+Kd×(de/dt)}, which is produced by multiplying both sides of the equation (1) by the adjustment coefficient k=k(I1) for increasing the feedback coefficient Kf when the upper peaks Iup and/or the lower peaks Ilp of the triangular-wave primary current I1 fall within the adjustment range Ra of 0 [A]±Ith (Ith represents a threshold value). As described above, when the upper peaks Iup of the primary current I1 is out of the adjustment range Ra, the adjustment coefficient k has a value of 1.0 {k(I1)=kmin=1.0}, and the adjustment coefficient k is of a value which progressively becomes greater as the peaks Iup, Ilp of the primary current I1 are closer to 0 [A].

Figure 14:
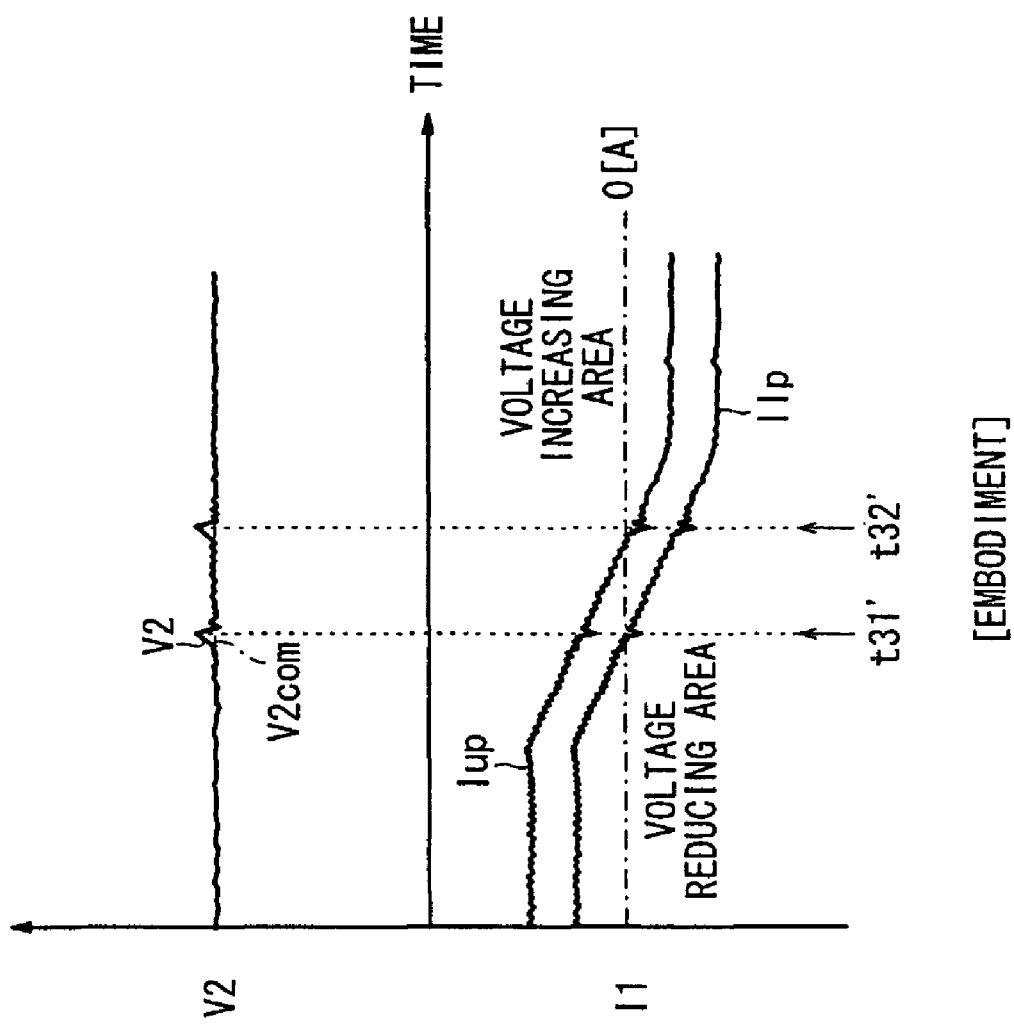
FIG. 14 is a diagram showing the manner in which the surges developed when the peaks of the primary current change across the zero value from the voltage increasing area to the voltage reducing area are reduced.

FIG. 14 shows how the secondary voltage V2 changes according to the present embodiment when the upper peaks Iup and the lower peaks Ilp of the primary current I1 change across 0 [A], with the adjustment coefficient k being greater toward 0 [A] (the characteristic curve k=k(I1) shown in FIG. 9)). According to the embodiment shown in FIG. 14, the surge voltages in the secondary voltage V2 diminish to a value of several [V] or lower as compared with the comparative example shown in FIG. 13. Although not shown, the surge voltages are also reduced according to the present embodiment as compared with the comparative example shown in FIG. 11.

According to the present embodiment described above, the DC/DC converter apparatus 23 which is disposed between the battery 24 serving as the first power device, the fuel cell 22 as the second power device, and the motor 26 energized by the inverter 34 sets the secondary voltage V2 to the target voltage Vtar, and operates according to the feedback process (feedback unit 135) and the feed-forward process (feed-forward unit 132). When the primary current I1 which flows through the reactor 90 changes across 0 [A] (zero value) at which its direction is changed, the feedback coefficients Kp, Ki, Kd by which to multiply the error e (e=V2−V2tar) between the secondary voltage V2 which is the measured voltage (output voltage) detected by the voltage sensor 63 and the target voltage Vtar, are increased respectively to the feedback coefficients kKp, kKi, kKd (k>1). Consequently, surges which are developed in the secondary voltage V2 are reduced.

Specifically, when the current flowing through the reactor 90 changes across 0 [A], surges (abrupt voltage fluctuations) developed in the secondary voltage V2 as the control voltage (output voltage) of the DC/DC converter 36 due to the dead time are reduced for stable control by temporarily increasing the feedback coefficient Kf.

The adjustment range Ra (see FIG. 9) for the feedback coefficients Kp, Ki, Kd (typified by the feedback coefficient Kf) is provided near the primary current I1 of 0 [A], or specifically within the threshold range±Ith. When it is detected that either the upper peaks Iup or the lower peaks Ilp of the primary current I1 fall into the adjustment range Ra (±Ith), the feedback coefficient Kf is multiplied by the adjustment coefficient k (k>1). Therefore, the detection error of the current sensor 62 is absorbed to reduce surges more reliably.

The feedback coefficient Kf is increased (the adjustment coefficient k is made greater) as the primary current I1 approaches 0 [A] in the adjustment range Ra. Accordingly, the detection error is absorbed for efficiently reducing surges. In FIG. 9, the adjustment coefficient k is linearly increased in a direction from threshold range±Ith toward 0 [A]. However, the adjustment coefficient k may be exponentially or logarithmically increased. The adjustment coefficient k should preferably be changed according to a characteristic curve which is optimum for each system which incorporates the DC/DC converter 36.

The primary current I1 which flows through the reactor 90 is of a triangular waveform having upper peaks Iup and lower peaks Ilp. Surges can be reduced effectively by increasing the feedback coefficient Kf (increasing the adjustment coefficient k) when either one of the peaks changes across 0 [A] and enters the adjustment range Ra or enters the adjustment range Ra and approaches the zero value.

Surges can be reduced more effectively by increasing the feedback coefficient Kf depending on one of the current values of the peaks which is closer to 0 [A] when both upper peaks Iup and lower peaks Ilp are in the adjustment range Ra.

Figure 15:
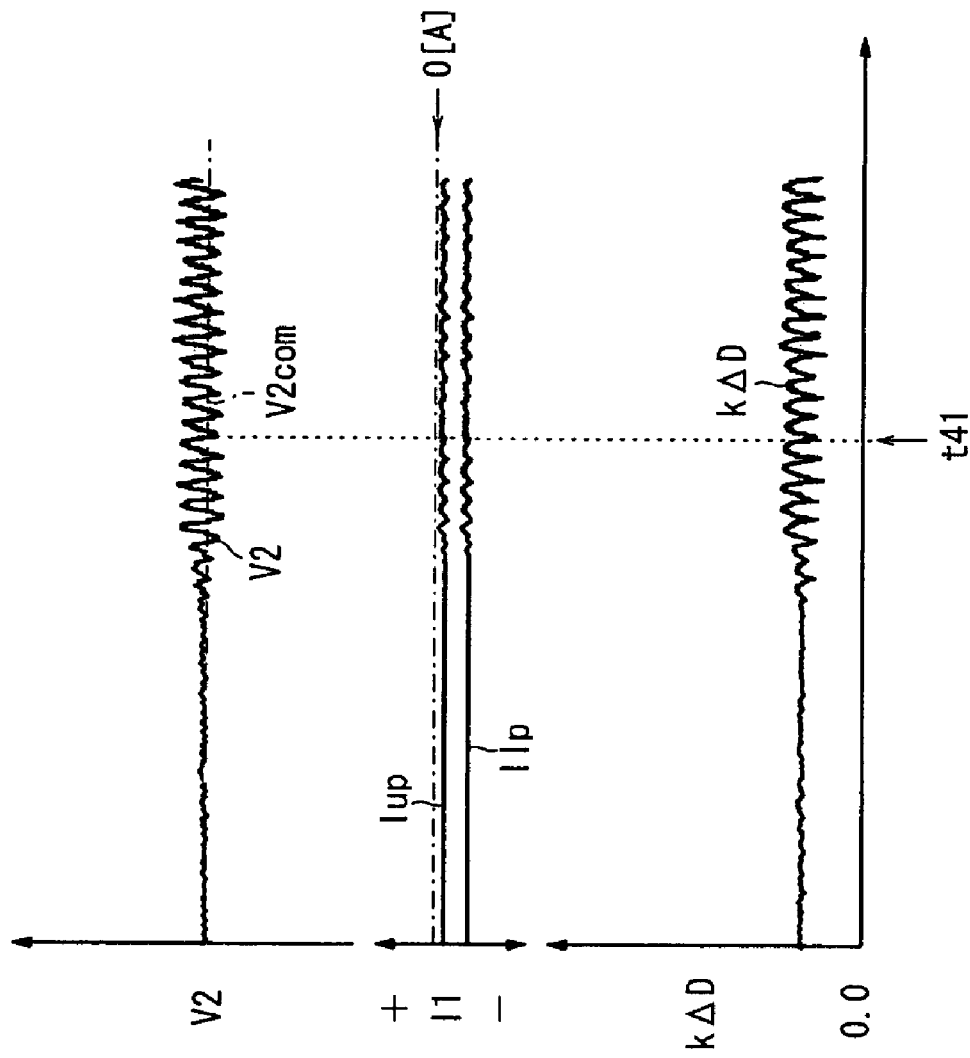
FIG. 15 is a diagram illustrative of the manner in which hunting is caused.

According to the above control process, when either one of the upper peaks Iup and lower peaks Ilp of the primary current I1 remains near 0 [A], as shown in a central portion of FIG. 15, the feedback coefficient kKf continues to be excessively large, as shown in a lower portion of FIG. 15. Therefore, the corrective duty ratio kΔD undergoes hunting, and, as a result, as shown in an upper portion of FIG. 15, the secondary voltage V2 also undergoes hunting though the command value V2com for the secondary voltage V2 is constant.

In order to suppress hunting when either one of the upper peaks Iup and lower peaks Ilp of the primary current I1 remains near 0 [A], a signal Ss (smoothed secondary voltage error signal Ss) is generated by smoothing the absolute value |e| (|e|=|V2−V2tar|=|V2−V2com|) of the error e (e=V2−V2tar=V2−V2com) of the secondary voltage V2, and a hunting suppressing process is performed for gradually returning the adjustment coefficient k to the value of 1 when the smoothed secondary voltage error signal Ss exceeds a predetermined threshold value. During the hunting suppressing process, a hunting suppressing flag Fh is set to 1 (Fh→1).

Figure 16:
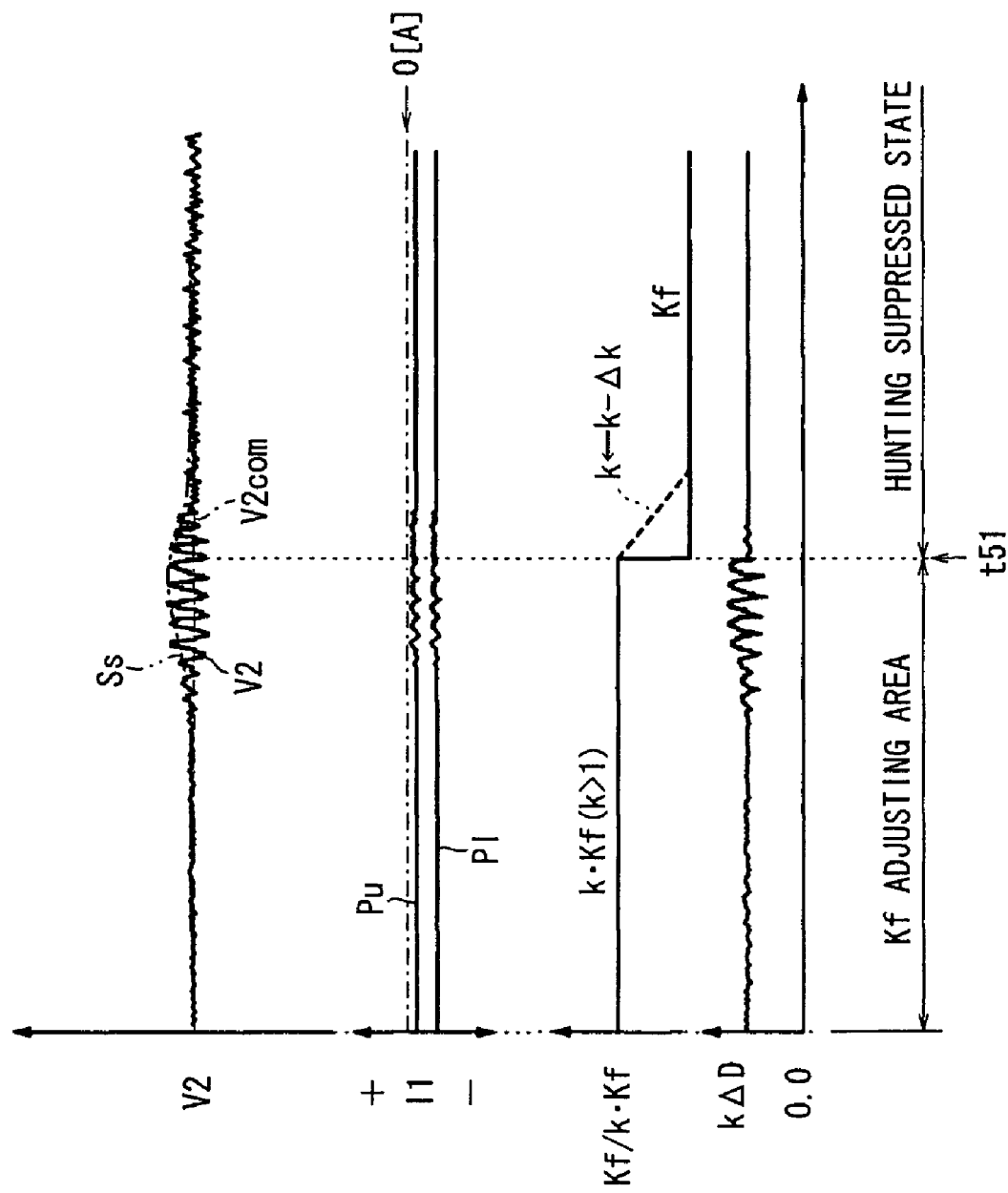
FIG. 16 is a diagram illustrative of the manner in which hunting is reduced.

The hunting suppressing process is effective to prevent the secondary voltage V2 from hunting after time t51 shown in FIG. 16 (which corresponds to time t41 shown in FIG. 15). It is assumed in FIG. 16 that the smoothed secondary voltage error signal Ss exceeds the predetermined threshold value at time t51. It can be understood that hunting of the secondary voltage V2 is suppressed after time t51. The adjustment coefficient k may be set to k=1 at time t51. It has been found, however, that the adjustment coefficient k should preferably be gradually reduced to the value of 1 from time t51 when the smoothed secondary voltage error signal Ss exceeds the predetermined threshold value, as indicated by the thick dotted line on the second graph from the bottom of FIG. 16.

Though not shown in FIG. 16, the hunting suppression which has continued from time t51 (the inhibition of the adjustment of the feedback coefficient) is canceled, i.e., the hunting suppressing process is canceled when both of the peaks Iup, Ilp of the primary current I1 go out of the adjustment range Ra (see FIG. 9), or when the command voltage V2com is changed, or stated otherwise the error e is increased to a predetermined value or higher (the hunting suppressing flag Fh is reset to 0 (Fh→0). When the hunting suppressing process for reducing the feedback coefficient Kf is canceled, the feedback coefficient Kf can be increased in quick response to the state where the reactor current changes across the zero value at which the current direction is changed, thereby reducing surges developed in the secondary voltage V2 serving as the control voltage.

Figure 17:
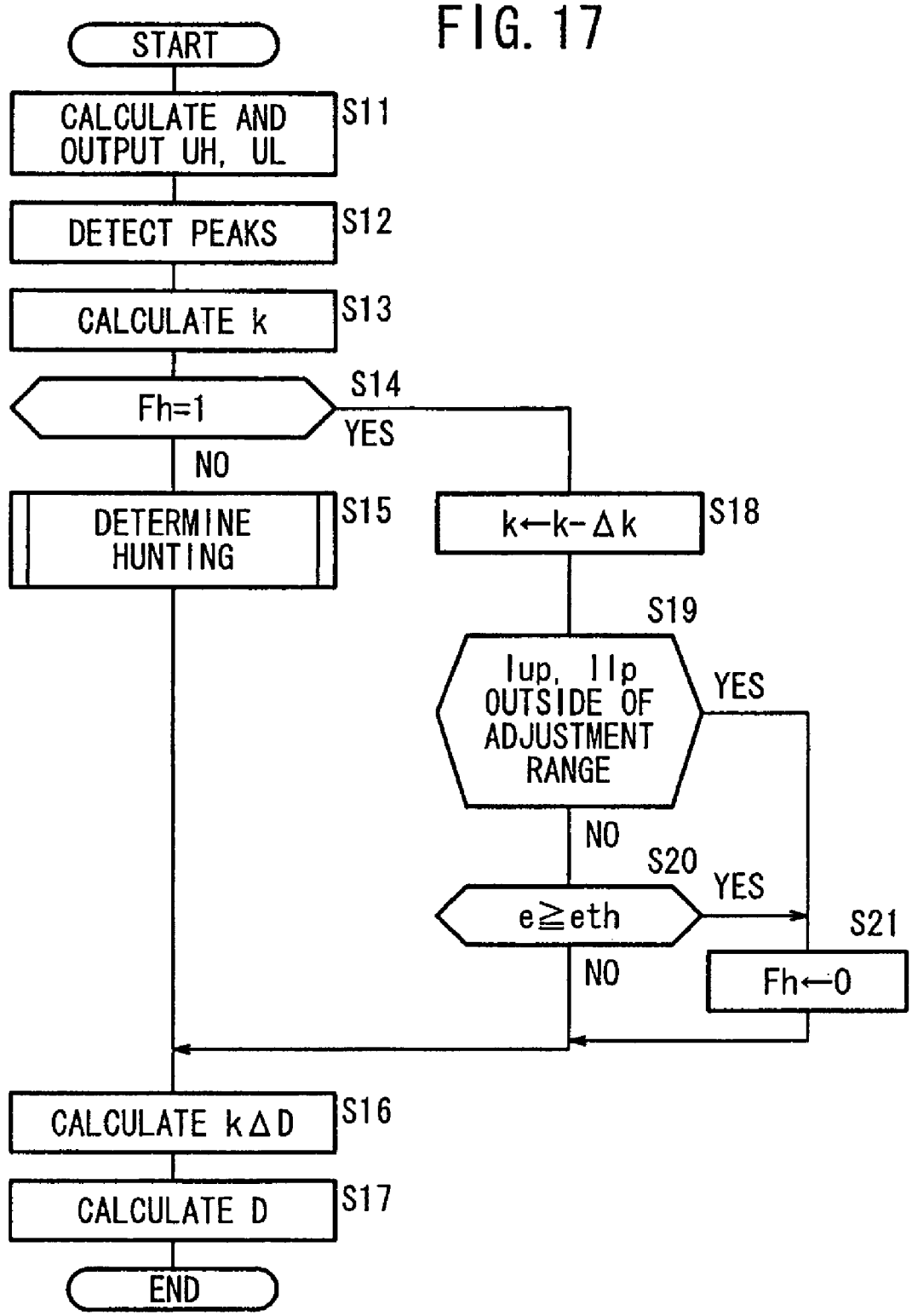
FIG. 17 is a flowchart of a surge reducing process and a hunting suppressing process.

FIG. 17 is a flowchart of the feedback coefficient adjusting process and the hunting suppressing process. These processes are carried out by the converter controller 54.

In step S11 shown in FIG. 17, the PWM processor 136 calculates and outputs PWM drive signals UH, UL depending on the previously calculated duty ratio D (see FIG. 8).

In step S12, the peak detector 144 detects peaks Iup, Ilp of the primary current I1.

In step S13, an adjustment coefficient k is calculated on the basis of the peaks Iup, Ilp of the primary current I1 according to the characteristic curve k(I1) shown in FIG. 9.

In step S14, it is determined whether the hunting suppressing flag Fh has been set or not (Fh=1 ?), the hunting suppressing flag Fh being set to 1 in next step S15 when the smoothed secondary voltage error signal Ss exceeds the threshold value or when the smoothed secondary voltage error signal Ss exceeds the threshold value for a predetermined time.

If the hunting suppressing flag Fh has not been set, then it is determined in step S15 whether the second voltage is in a hunting state or not by determining whether the smoothed secondary voltage error signal Ss exceeds the threshold value (or exceeds the threshold value for a predetermined time) or not. If it is judged that the voltage is in a hunting state, then the hunting suppressing flag Fh (Fh→1) is set.

In step S16 (NO in step S14 and after step S15), the corrective duty ratio ΔD is multiplied by the adjustment coefficient k calculated in step S13, thereby producing an adjusted corrective duty ratio kΔD.

In step S17, a duty ratio D=Ds+kΔD is calculated. Thereafter, control goes back to step S11 to calculate and output drive signals UH, UL.

If it is judged in step S14 that the hunting suppressing flag Fh has been set in previous step S15 (Fh=1), then, in order to bring the coefficient k back to the value of 1, in step S18, the adjustment coefficient k is reduced by a predetermined value (k←k−Δk) in a predetermined time, or actually each cycle from step S11 to step S14 (YES) to step S18 to step S19 (NO) to step S20 (NO) to step S16 to step S17 to step S11.

In step S19, it is determined whether the peaks Iup, Ilp of the primary current I1 go out of the adjustment range Ra or not.

If the peaks Iup, Ilp falls within the adjustment range Ra, then it is determined in step S20 whether or not the V2 error e (e=Vtar−V2) is equal to or greater than a threshold value eth, e.g., eth=5 [V] (e≧eth).

If the error e is equal to or greater than the threshold value eth, then it is judged that the primary current I1 has changed across the zero value and a surge is developed in the secondary voltage V2, and the hunting suppressing flag Fh is reset.

If the error e is smaller than the threshold value eth, then it is judged that hunting has not been eliminated. In step S16, the adjustment coefficient k←k−Δk calculated in step S18 is assigned to the adjustment coefficient k. Thereafter, the converter controller 54 continues the hunting suppressing process in step S17 and subsequently.

According to the present embodiment, as described above, the upper and lower peaks Iup, Ilp of the primary current I1 flowing through the reactor (the peak and bottom values (maximum and minimum values of the triangular waveform of the primary current I1)) are detected, and if a smaller one of the absolute values |Iup|, |Ilp| of the upper and lower peaks Iup, Ilp is equal to or smaller than a threshold value th, then the feedback coefficient Kf for the voltage feedback control process is increased to kKf depending on the smaller one of the absolute values.

If hunting occurs while either one of the absolute values of the peak and bottom values of the primary current I1 becomes equal to or smaller than the threshold value Ith and the feedback coefficient Kf is increased to kKf, then the feedback coefficient Kf is prevented from being increased, but brought back to its original value (k=1) to suppress hunting. If both of the absolute values of the upper and lower peaks Iup, Ilp of the primary current I1 become greater than the threshold value Ith while hunting is being suppressed (YES in step S19), or if the control error e is equal to or greater than the threshold value eth (YES in step S20), then the suppression of hunting is canceled in step S21.

The load connected to the hybrid power supply system 10 may comprise a DC load rather than the motor 26 which is an AC load energized by the inverter 34.

The present invention is not limited to being applied to the fuel cell vehicle according to the illustrated embodiment, but is also applicable to fuel cell vehicles incorporating a hybrid DC power supply system, which includes a DC/DC converter having three phase arms, i.e., a U phase, a V phase, and a W phase, rather than the DC/DC converter 36 with the single-phase arm UA.

Although a certain preferred embodiment of the present invention has been shown and described in detail, it should be understood that various changes and modifications may be made to the embodiment without departing from the scope of the invention as set forth in the appended claims.

What is claimed is:

1. A method of controlling a DC/DC converter disposed between a first power device and a second power device and including upper and lower arm switching devices and a reactor, comprising the steps of:
setting an output voltage of either one of the first power device and the second power device as a target voltage;
detecting the output voltage set as the target voltage; and
controlling the DC/DC converter by multiplying an error between the detected output voltage and the target voltage by a feedback coefficient to perform feedback control, alternately turning on the upper and lower arm switching devices respectively before and after a dead time so that the output voltage can be equal to the target voltage, detecting a reactor current flowing through the reactor, increasing the feedback coefficient when the detected reactor current is detected as changing across a zero value at which a direction of the reactor current is changed, and performing a hunting suppressing process for reducing the feedback coefficient when the reactor current is detected as undergoing hunting though the target voltage is fixed while the feedback coefficient is being increased.

2. A method according to claim 1, wherein the step of controlling the DC/DC converter further comprises the steps of:
providing an adjustment range for the feedback coefficient near the zero value, and increasing the feedback coefficient when the reactor current is detected as falling within the adjustment range.

3. A method according to claim 2, wherein the step of controlling the DC/DC converter further comprises the step of:
increasing the feedback coefficient when the reactor current falls within the adjustment range and approaches the zero value.

4. A method according to claim 2, wherein the reactor current is of a triangular waveform having an upper peak and a lower peak, and the step of controlling the DC/DC converter further comprises the step of:
increasing the feedback coefficient when either one of the upper peak and the lower peak changes across the zero value, or falls within the adjustment range, or falls within the adjustment range and approaches the zero value.

5. A method according to claim 2, wherein the reactor current is of a triangular waveform having an upper peak and a lower peak, and the step of controlling the DC/DC converter further comprises the step of:
increasing the feedback coefficient depending on one of current values of the upper peak and the lower peak which is closer to the zero value when both of the upper peak and the lower peak fall within the adjustment range.

6. A method according to claim 1, wherein the step of controlling the DC/DC converter further comprises the step of:
performing a hunting suppressing process for reducing the feedback coefficient when the output voltage is detected as undergoing hunting near the target voltage while the feedback coefficient is being increased.

7. A method according to claim 6, wherein the step of controlling the DC/DC converter further comprises the step of:
gradually reducing the feedback coefficient.

8. A method according to claim 6, wherein the step of controlling the DC/DC converter further comprises the step of:
detecting whether the output voltage undergoes hunting or not, based on the error between the output voltage and the target voltage.

9. A method of controlling a DC/DC converter disposed between a first power device and a second power device and including upper and lower arm switching devices and a reactor, comprising the steps of:
setting an output voltage of either one of the first power device and the second power device as a target voltage;
detecting the output voltage set as the target voltage; and
controlling the DC/DC converter by multiplying an error between the detected output voltage and the target voltage by a feedback coefficient to perform feedback control, alternately turning on the upper and lower arm switching devices respectively before and after a dead time so that the output voltage can be equal to the target voltage, detecting a reactor current flowing through the reactor, increasing the feedback coefficient when the detected reactor current is detected as changing across a zero value at which a direction of the reactor current is changed, performing a hunting suppressing process for reducing the feedback coefficient when the output voltage is detected as undergoing hunting near the target voltage while the feedback coefficient is being increased, detecting whether the output voltage undergoes hunting or not, based on the error between the output voltage and the target voltage, and detecting the output voltage as undergoing hunting if the value of a signal generated by smoothing the absolute value of the error is equal to or greater than a first threshold voltage.

10. A method according to claim 6, wherein the step of controlling the DC/DC converter further comprises the steps of:
providing an adjustment range for the feedback coefficient near the zero value, and canceling the hunting suppressing process when the reactor current falls outside of the adjustment range.

11. A method according to claim 6, wherein the step of controlling the DC/DC converter further comprises the step of:
canceling the hunting suppressing process when the error increases to a value equal to or greater than a second threshold voltage during the hunting suppressing process.

12. A method according to claim 1, wherein the first power device comprises an electricity storage device, and the second power device comprises a fuel cell.

13. A method according to claim 1, wherein the first power device comprises an electricity storage device, and the second power device comprises a motor for generating regenerative electric power.

14. A fuel cell vehicle for carrying out a method of controlling a DC/DC converter disposed between a first power device and a second power device and including upper and lower arm switching devices and a reactor, the method comprising the steps of:
setting an output voltage of either one of the first power device and the second power device as a target voltage;
detecting the output voltage set as the target voltage; and
controlling the DC/DC converter by multiplying an error between the detected output voltage and the target voltage by a feedback coefficient to perform feedback control, alternately turning on the upper and lower arm switching devices respectively before and after a dead time so that the output voltage can be equal to the target voltage, detecting a reactor current flowing through the reactor, increasing the feedback coefficient when the detected reactor current is detected as changing across a zero value at which a direction of the reactor current is changed, and performing a hunting suppressing process for reducing the feedback coefficient when the reactor current is detected as undergoing hunting though the target voltage is fixed while the feedback coefficient is being increased,
wherein the first power device comprises an electricity storage device, and the second power device comprises a fuel cell and a motor for generating regenerative electric power.

* * * * *